US011985697B2

(12) United States Patent
Chen et al.

(10) Patent No.: US 11,985,697 B2
(45) Date of Patent: May 14, 2024

(54) TIMING ADVANCE (TA) DETERMINING METHOD AND APPARATUS FOR TERMINAL DEVICE

(71) Applicant: Huawei Technologies Co., Ltd., Shenzhen (CN)

(72) Inventors: Ying Chen, Hangzhou (CN); Hejia Luo, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 17/513,546

(22) Filed: Oct. 28, 2021

(65) Prior Publication Data
US 2022/0053555 A1  Feb. 17, 2022

Related U.S. Application Data

(63) Continuation of application No. PCT/CN2020/086323, filed on Apr. 23, 2020.

(30) Foreign Application Priority Data

Apr. 29, 2019  (CN) ......................... 201910356653.6

(51) Int. Cl.
*H04W 76/00*  (2018.01)
*H04W 56/00*  (2009.01)
(Continued)

(52) U.S. Cl.
CPC ..... *H04W 74/006* (2013.01); *H04W 56/0045* (2013.01); *H04W 74/0833* (2013.01); *H04L 27/26025* (2021.01)

(58) Field of Classification Search
CPC ........... H04W 74/006; H04W 56/0045; H04W 74/0833; H04L 27/26025; H04B 7/1853
See application file for complete search history.

(56) References Cited

U.S. PATENT DOCUMENTS 11,496,979 B2 * 11/2022 Turtinen ............... H04L 5/0007
2019/0053228 A1   2/2019 Akkarakaran et al.
(Continued)

FOREIGN PATENT DOCUMENTS

CN  101505214 A  8/2009
CN  102647783 A  8/2012
(Continued)

OTHER PUBLICATIONS

"Discussion on carrier aggregation and bandwidth parts," 3GPP TSG RAN WG1 Meeting NR#3, Nagoya, Japan, R1-1715892, pp. 1-12, 3rd Generation Partnership Project, Valbonne, France (Sep. 18-21, 2017).
(Continued)

*Primary Examiner* — Hashim S Bhatti
(74) *Attorney, Agent, or Firm* — Leydig, Voit & Mayer, Ltd.

(57) ABSTRACT

This application provides a TA determining method and apparatus for a terminal device. After receiving a TA adjustment parameter sent by an access network device and determining that a TA of the terminal device needs to be adjusted, the terminal device determines a TA scaling factor, a subcarrier spacing parameter, and a first TA, to jointly adjust the first TA to obtain a second TA. ATA adjustment parameter k is added when the terminal device determines the second TA, so that an adjustable range of the TA is larger. Therefore, the TA may be applied to determining the TA of the terminal device when the terminal device communicates with a satellite base station. In this way, the terminal device
(Continued)

can adjust the TA when movement of a device is caused by both the terminal device and the satellite base station.

20 Claims, 10 Drawing Sheets

(51) Int. Cl.
*H04W 74/00* (2009.01)
*H04W 74/0833* (2024.01)
*H04L 27/26* (2006.01)

(56) References Cited

U.S. PATENT DOCUMENTS

| | | | |
|---|---|---|---|
| 2019/0082408 A1 | 3/2019 | Kim et al. | |
| 2021/0345272 A1* | 11/2021 | Chatterjee | H04W 56/0045 |
| 2022/0039045 A1* | 2/2022 | Sun | H04W 56/0015 |
| 2022/0191938 A1* | 6/2022 | Luo | H04W 72/1273 |

FOREIGN PATENT DOCUMENTS

| | | |
|---|---|---|
| CN | 108243391 A | 7/2018 |
| CN | 111565472 A | 8/2020 |
| CN | 111867039 A | 10/2020 |
| CN | 202111489370.2 | 3/2024 |
| RU | 2521964 C2 | 7/2014 |
| WO | 2019038294 A1 | 2/2019 |
| WO | 2019062779 A1 | 4/2019 |

OTHER PUBLICATIONS

"Discussion on timing advance and RACH procedures for NTN," 3GPP TSG RAN WG1 Meeting #96bis, R1-1904000, Xi'an, China, Total 7 pages, 3rd Generation Partnership Project, Valbonne, France (Apr. 8-12, 2019).

"Considerations on MAC Timers and on RTD Compensation Offset in Non-Terrestrial Networks (NTN)," 3GPP TSG-RAN WG2 Meeting # 104, R2-1818511, Spokane, USA, pp. 1-5, 3rd Generation Partnership Project, Valbonne, France (Nov. 12-16, 2018).

"Doppler Compensation, Uplink Timing Advance and Random Access in NTN," 3GPP TSG RAN WG1 Meeting #97, R1-1906087, Reno, USA, pp. 1-13, 3rd Generation Partnership Project, Valbonne, France (May 13-17, 2019).

"Doppler Compensation, Uplink Timing Advance, and Random Access and UE Location in NTN," 3GPP TSG RAN WG1 Meeting #96bis, R1-1904650, Xi'an, China, pp. 1-15, 3rd Generation Partnership Project, Valbonne, France (Apr. 8-12, 2019).

"NR-NTN: Preliminary solutions for NR to support non-terrestrial networks," 3GPP TSG RAN Meeting #80, RP-180664, La Jolla, USA, pp. 1-16, 3rd Generation Partnership Project, Valbonne, France (Jun. 11-14, 2018).

"3rd Generation Partnership Project; Technical Specification Group Radio Access Network; NR; Physical channels and modulation (Release 15)," 3GPP TS 38.211 V15.5.0, pp. 1-96, 3rd Generation Partnership Project, Valbonne, France (Mar. 2019).

* cited by examiner

TIMING ADVANCE (TA) DETERMINING METHOD AND APPARATUS FOR TERMINAL DEVICE

CROSS-REFERENCE TO RELATED APPLICATIONS

This application is a continuation of International Application No. PCT/CN2020/086323, filed on Apr. 23, 2020, which claims priority to Chinese Patent Application No. 201910356653.6, filed on Apr. 29, 2019. The disclosures of the aforementioned applications are hereby incorporated by reference in their entireties.

TECHNICAL FIELD

This application relates to the communications field, and in particular, to a timing advance (TA) determining method and apparatus for a terminal device, and a system.

BACKGROUND

When a terminal device communicates with an access network device (for example, a base station), if the terminal device is far away from the access network device, a relatively large transmission delay exists when the terminal device sends uplink communication data to the access network device. Therefore, the access network device sets a timing advance (TA) of the terminal device. In this way, the terminal device can obtain, by using the TA, a negative offset between a first time at which the terminal device receives downlink communication data of the access network device and a second time at which the terminal device sends the uplink communication data to the access network device. Therefore, the terminal device can send the uplink communication data to the access network device in advance based on the TA, to reduce a transmission delay of the uplink communication data.

In a random access process of the terminal device, the access network device determines the TA of the terminal device based on a random access preamble sent by the terminal device, and sends a TA initial parameter to the terminal device by using a TAC field. Therefore, the terminal device can determine the TA based on the TA initial parameter. After the terminal device performs random access, for mobility of the terminal device, the access network device determines, by measuring the uplink communication data of the terminal device, to adjust the TA of the terminal device, and also sends a TA adjustment parameter to the terminal device by using the TAC field. Therefore, the terminal device can adjust the TA based on the TA adjustment parameter. In addition, in a communications system, for example, a 5th generation mobile networks new radio access technology (5G NR), an adjustment range each time the access network device adjusts the TA of the terminal device and a total range that can be adjusted in a period of time are limited.

However, only the mobility of the terminal device is considered in an existing TA determining method. When the access network device is a satellite base station, because the satellite base station itself also has mobility, an existing TA determining method for a terminal device cannot be directly applied to the satellite base station. Therefore, how to enable the TA determining method for a terminal device to be applied to the satellite base station is a technical problem to be urgently resolved in this field.

SUMMARY

This application provides a TA determining method and apparatus for a terminal device, and a system, to resolve a problem that a TA determining method for a terminal device in the conventional technology cannot be applied to a satellite base station.

According to a first aspect of this application, a TA determining method for a terminal device is provided, including:

obtaining a TA adjustment parameter from an access network device, where the TA adjustment parameter is used to indicate a TA adjustment of the terminal device;

determining a TA scaling factor of the terminal device, a subcarrier spacing parameter of the terminal device, and a first TA used when the terminal device communicates with the access network device before receiving the TA adjustment parameter, where the TA scaling factor is used to perform scaling processing on the TA adjustment of the terminal device; and determining a second TA based on the TA adjustment parameter, the TA scaling factor, the subcarrier spacing parameter, and the first TA.

In conclusion, in the TA determining method for a terminal device provided in this application, after receiving the TA adjustment parameter sent by the access network device and determining that a TA of the terminal device needs to be adjusted, the terminal device determines the TA scaling factor, the subcarrier spacing parameter, and the first TA, to jointly adjust the first TA to obtain the second TA. In this embodiment, a TA adjustment parameter k is added when the terminal device determines the second TA, so that an adjustable range is larger when the terminal device adjusts the TA. Therefore, the TA may be applied to, for example, a satellite communications system, to adjust the TA when a device moves caused by both the terminal device and a satellite base station. In addition, the TA determining method for a terminal device in this embodiment may be further applied to an existing ground communications system, and the terminal device may adjust the TA only in consideration of mobility of the terminal device. Therefore, the TA determining method for a terminal device provided in this embodiment may be further applied to both a ground fixed base station and a satellite base station, and is portable.

In an embodiment of the first aspect of this application, the determining a second TA based on the TA adjustment parameter, the TA scaling factor, the subcarrier spacing parameter, and the first TA includes: calculating $TA_2$ by using a formula $TA_2 = TA_1 + k \cdot (T_A - 31) \cdot 16 \cdot 64/2^\mu$.

$TA_1$ is the first TA, $T_A$ is the TA adjustment parameter, k is the TA scaling factor, $2^\mu$ is the subcarrier spacing parameter, $\Delta f = 2^\mu \cdot 15$ [kHz], and $\Delta f$ is a subcarrier spacing of the terminal device.

In conclusion, in the TA determining method for a terminal device provided in this embodiment, the second TA is calculated by using a formula, and an extension is performed on the basis of an existing TA determining method, so that the TA determining method in this embodiment is portable and compatible with an existing communications system.

In an embodiment of the first aspect of this application, the determining a TA scaling factor includes: determining the TA scaling factor based on a maximum moving speed of the terminal device, a moving speed of the access network device, and a frequency at which the access network device indicates the terminal device to adjust the TA.

In an embodiment of the first aspect of this application, the determining the TA scaling factor based on a maximum moving speed of the terminal device, a moving speed of the access network device, and a frequency at which the access network device indicates the terminal device to adjust the TA includes: calculating the TA scaling factor k by using a formula $2(v_1+v_2)/f_{TA}/c=k\cdot32\cdot16\cdot64\cdot T_c/8$.

$v_1$ is the maximum moving speed of the terminal device, $v_2$ is the moving speed of the access network device, $f_{TA}$ is the frequency at which the access network device indicates the terminal device to adjust the TA, c is a lightspeed, and $T_c$ is a basic time unit.

In an embodiment of the first aspect of this application, the method further includes: determining whether the TA adjustment of the terminal device processed by the TA scaling factor meets a preset condition; and if the TA adjustment of the terminal device meets the preset condition, determining the second TA based on the TA adjustment parameter, the TA scaling factor, the subcarrier spacing parameter, and the first TA.

In an embodiment of the first aspect of this application, the method includes: determining the TA scaling factor based on a moving speed of the access network device, a height of the access network device, and a height timing advance of the access network device.

In an embodiment of the first aspect of this application, the determining the TA scaling factor based on a moving speed of the access network device, a height of the access network device, and a height timing advance of the access network device includes:
  determining, by searching a first mapping relationship, the TA scaling factor corresponding to the moving speed of the access network device, the height at which the access network device is located, and the height timing advance of the access network device. The first mapping relationship includes a correspondence between at least one of the moving speed of the access network device, the height of the access network device, and the height timing advance of the access network device, and the TA scaling factor.

In an embodiment of the first aspect of this application, the determining the TA scaling factor based on a moving speed of the access network device, a height of the access network device, and a height timing advance of the access network device includes:
  determining, by searching a second mapping relationship, the TA scaling factor corresponding to the subcarrier spacing of the terminal device, the moving speed of the access network device, the height at which the access network device is located, and the height timing advance of the access network device. The second mapping relationship includes a correspondence between at least one of the subcarrier spacing of the terminal device, the moving speed of the access network device, the height of the access network device, and the height timing advance of the access network device, and the TA scaling factor.

In conclusion, in the TA determining method for a terminal device provided in this embodiment, the terminal device can obtain, by using a smaller calculation amount, the TA that needs to be adjusted by searching a mapping relationship. This improves a speed and efficiency of determining the TA by the terminal device.

In an embodiment of the first aspect of this application, the determining a TA scaling factor includes: determining the TA scaling factor based on a format of a random access preamble used by the terminal device in a process of randomly accessing the access network device.

In an embodiment of the first aspect of this application, the determining a second TA based on the TA adjustment parameter, the TA scaling factor, the subcarrier spacing parameter, and the first TA includes: determining the second TA based on a TA offset parameter, the TA adjustment parameter, the TA scaling factor, the subcarrier spacing parameter, and the first TA. The TA offset parameter is used to perform offset processing on the TA adjustment of the terminal device.

In an embodiment of the first aspect of this application, the determining a TA scaling factor includes: determining the TA scaling factor based on attribute information of the access network device.

In an embodiment of the first aspect of this application, before the obtaining a TA adjustment parameter from an access network device, the method further includes:
  receiving indication information sent by the access network device, where the indication information is used to indicate a common delay of a cell in which the terminal device is located; and
  determining the common delay based on the indication information.

In an embodiment of the first aspect of this application, before the obtaining a TA adjustment parameter from an access network device, the method further includes:
  when the terminal device accesses the access network device for a first time, obtaining a TA initial parameter from the access network device; and
  determining an initial TA based on the common delay, the TA initial parameter, and the subcarrier spacing parameter.

In an embodiment of the first aspect of this application, the common delay includes the height timing advance of the access network device and an angular timing advance of the cell in which the terminal device is located.

In conclusion, in the TA determining method for a terminal device provided in this embodiment, the terminal device can jointly determine the initial TA of the terminal device based on the common delay indicated by the access network device and the TA initial parameter. Because the terminal device can determine the initial TA based on the common delay indicated by the access network device, the TA determining method for a terminal device can be applied to a radar base station, so that the radar base station compensates the TA of the terminal device based on a height of the radar and an angle of the cell.

In an embodiment of the first aspect of this application, if the terminal device is in a static state, a TA drift rate of the terminal device is determined, where the TA drift rate is used to indicate a TA adjustment that is in the cell in which the terminal device is located and that is caused by movement of the access network device; and a fourth TA is determined based on the TA drift rate, a third TA, the TA adjustment parameter, and the subcarrier spacing parameter, where the third TA is a TA used when the terminal device communicates with the access network device before determining the fourth TA.

In an embodiment of the first aspect of this application, the determining a fourth TA based on the TA drift rate, a third TA, the TA adjustment parameter, and the subcarrier spacing parameter includes: calculating the fourth TA by using a formula $TA_4=TA_3+\Delta N_{TA}+\Delta N_{TA}'\cdot\Delta t \cdot \Delta N_{TA}=(T_A-31)\cdot16\cdot64/2^\mu$, TA is the TA adjustment parameter sent by the access network device, $\Delta N_{TA}'$ is the TA adjustment, $\Delta t=t1-t0$, t0 is a time at which the terminal device receives the TA adjustment parameter, and t1 is a time at which the terminal device is to send uplink communication data to the access network device.

In an embodiment of the first aspect of this application, the determining a TA drift rate of the terminal device includes: determining the TA drift rate of the terminal device according to a third mapping relationship. The third mapping relationship includes a correspondence between a Doppler frequency shift of at least one access network device and the TA drift rate of the terminal device.

In conclusion, in the TA determining method for a terminal device provided in this embodiment, the terminal device may pre-compensate TA adjustment based on a parameter, for example, Doppler, to avoid frequent indications of TA adjustment by the satellite base station, and reduce resource overheads. In addition, because a communication delay between the satellite base station and the terminal device is relatively large, performing pre-compensation by using the method of this embodiment can reduce a TA error introduced by a delay when the satellite base station indicates to adjust the TA.

According to a second aspect of this application, a TA determining method for a terminal device is provided, including:
 determining a TA adjustment parameter of the terminal device, where the TA adjustment parameter is used to indicate a TA adjustment of the terminal device; and
 sending the TA adjustment parameter to the terminal device, so that the terminal device determines a second TA based on the TA adjustment parameter, a TA scaling factor, a subcarrier spacing parameter, and a first TA. The TA scaling factor is used to perform scaling processing on the TA adjustment of the terminal device, and the first TA is a TA used when the terminal device communicates with an access network device before receiving the TA adjustment parameter.

In an embodiment of the second aspect of this application, the method further includes: sending indication information to the terminal device. The indication information is used to indicate a common delay of a cell in which the terminal device is located.

In an embodiment of the second aspect of this application, the common delay includes a height timing advance of the access network device and an angular timing advance of the cell in which the terminal device is located.

In an embodiment of the second aspect of this application, the sending indication information to the terminal device includes: broadcasting the common delay in the cell in which the terminal device is located; or broadcasting the height timing advance in a coverage area of the access network device, and broadcasting the angular timing advance in the cell in which the terminal device is located.

According to a third aspect of this application, a TA determining apparatus for a terminal device is provided, configured to execute the TA determining method for a terminal device in the first aspect of this application. The apparatus includes:
 a transceiver module, configured to obtain a TA adjustment parameter from an access network device, where the TA adjustment parameter is used to indicate a TA adjustment of the terminal device;
 a parameter determining module, configured to determine a TA scaling factor of the terminal device, a subcarrier spacing parameter of the terminal device, and a first TA used when the terminal device communicates with the access network device before receiving the TA adjustment parameter, where the TA scaling factor is used to perform scaling processing on the TA adjustment of the terminal device; and a TA determining module, configured to determine a second TA based on the TA adjustment parameter, the TA scaling factor, the subcarrier spacing parameter, and the first TA.

In an embodiment of the third aspect of this application, the TA determining module is specifically configured to calculate $TA_2$ by using a formula $TA_2 = TA_1 + k \cdot (T_A - 31) \cdot 16 \cdot 64/2^\mu$.

$TA_1$ is the first TA, $T_A$ is the TA adjustment parameter, k is the TA scaling factor, $2^\mu$ is the subcarrier spacing parameter, $\Delta f = 2^\mu \cdot 15$ [kHz], and $\Delta f$ is a subcarrier spacing of the terminal device.

In an embodiment of the third aspect of this application, the parameter determining module is specifically configured to determine the TA scaling factor based on a maximum moving speed of the terminal device, a moving speed of the access network device, and a frequency at which the access network device indicates the terminal device to adjust a TA.

In an embodiment of the third aspect of this application, the parameter determining module is specifically configured to calculate the TA scaling factor k by using a formula $2(v_1 + v_2)/f_{TA}/c = k \cdot 32 \cdot 16 \cdot 64 \cdot T_c/8$.

$v_1$ is the maximum moving speed of the terminal device, $v_2$ is the moving speed of the access network device, $f_{TA}$ is the frequency at which the access network device indicates the terminal device to adjust the TA, c is a lightspeed, and $T_c$ is a basic time unit.

In an embodiment of the third aspect of this application, the parameter determining module is further configured to: determine whether the TA adjustment of the terminal device processed by the TA scaling factor meets a preset condition; and if the TA adjustment of the terminal device meets the preset condition, determine the second TA based on the TA adjustment parameter, the TA scaling factor, the subcarrier spacing parameter, and the first TA.

In an embodiment of the third aspect of this application, the parameter determining module is specifically configured to determine the TA scaling factor based on the moving speed of the access network device, a height of the access network device, and a height timing advance of the access network device.

In an embodiment of the third aspect of this application, the parameter determining module is specifically configured to determine, by searching a first mapping relationship, the TA scaling factor corresponding to the moving speed of the access network device, the height at which the access network device is located, and the height timing advance of the access network device. The first mapping relationship includes a correspondence between at least one of the moving speed of the access network device, the height of the access network device, and the height timing advance of the access network device, and the TA scaling factor.

In an embodiment of the third aspect of this application, the parameter determining module is specifically configured to determine, by searching a second mapping relationship, the TA scaling factor corresponding to the subcarrier spacing of the terminal device, the moving speed of the access network device, the height at which the access network device is located, and the height timing advance of the access network device. The second mapping relationship includes a correspondence between at least one of the subcarrier spacing of the terminal device, the moving speed of the access network device, the height of the access network device, and the height timing advance of the access network device, and the TA scaling factor.

In an embodiment of the third aspect of this application, the parameter determining module is specifically configured to determine the TA scaling factor based on a format of a random access preamble used by the terminal device in a process of randomly accessing the access network device.

In an embodiment of the third aspect of this application, the TA determining module is further configured to determine the second TA based on a TA offset parameter, the TA adjustment parameter, the TA scaling factor, the subcarrier spacing parameter, and the first TA. The TA offset parameter is used to perform offset processing on the TA adjustment of the terminal device.

In an embodiment of the third aspect of this application, the TA determining module is specifically configured to determine the TA scaling factor based on attribute information of the access network device.

In an embodiment of the third aspect of this application, the transceiver module is further configured to receive indication information sent by the access network device. The indication information is used to indicate a common delay of a cell in which the terminal device is located.

In an embodiment of the third aspect of this application, the parameter determining module is specifically configured to determine the common delay based on the indication information.

In an embodiment of the third aspect of this application, the transceiver module is further configured to: when the terminal device accesses the access network device for a first time, obtain a TA initial parameter from the access network device.

The TA determining module is further configured to determine an initial TA based on the common delay, the TA initial parameter, and the subcarrier spacing parameter.

In an embodiment of the third aspect of this application, the common delay includes a height timing advance of the access network device and an angular timing advance of the cell in which the terminal device is located.

In an embodiment of the third aspect of this application, the parameter determining module is further configured to: if the terminal device is in a static state, determine a TA drift rate of the terminal device. The TA drift rate is used to indicate a TA adjustment that is in the cell in which the terminal device is located and that is caused by movement of the access network device.

The TA determining module is further configured to determine a fourth TA based on the TA drift rate, a third TA, the TA adjustment parameter, and the subcarrier spacing parameter. The third TA is a TA used when the terminal device communicates with the access network device before determining the fourth TA.

In an embodiment of the third aspect of this application, the TA determining module is further configured to calculate the fourth TA by using a formula $TA_4 = TA_3 + \Delta N_{TA} + \Delta N'_{TA} \cdot \Delta t$. $\Delta N_{TA} = (T_A - 31) \cdot 16 \cdot 64 / 2^\mu$, TA is the TA adjustment parameter sent by the access network device, $\Delta N'_{TA}$ is the TA adjustment, $\Delta t = t1 - t0$, t0 is a time at which the terminal device receives the TA adjustment parameter, and t1 is a time at which the terminal device is to send uplink communication data to the access network device.

In an embodiment of the third aspect of this application, the parameter determining module is further configured to determine the TA drift rate of the terminal device according to a third mapping relationship. The third mapping relationship includes a correspondence between a Doppler frequency shift of at least one access network device and the TA drift rate of the terminal device.

According to a fourth aspect of this application, a TA determining apparatus for a terminal device is provided, configured to execute the TA determining method for a terminal device in the second aspect of this application. The apparatus includes:
a determining module, configured to determine a TA adjustment parameter of the terminal device, where the TA adjustment parameter is used to indicate a TA adjustment of the terminal device; and
a transceiver module, configured to send the TA adjustment parameter to the terminal device, so that the terminal device determines a second TA based on the TA adjustment parameter, a TA scaling factor, a subcarrier spacing parameter, and a first TA. The TA scaling factor is used to perform scaling processing on the TA adjustment of the terminal device, and the first TA is a TA used when the terminal device communicates with an access network device before receiving the TA adjustment parameter.

In an embodiment of the fourth aspect of this application, the transceiver module is further configured to send indication information to the terminal device. The indication information is used to indicate a common delay of a cell in which the terminal device is located.

In an embodiment of the fourth aspect of this application, the common delay includes a height timing advance of the access network device and an angular timing advance of the cell in which the terminal device is located.

In an embodiment of the fourth aspect of this application, the transceiver module is specifically configured to: broadcast the common delay in the cell in which the terminal device is located; or broadcast the height timing advance in a coverage area of the access network device and broadcast the angular timing advance in the cell in which the terminal device is located.

According to a fifth aspect of this application, a communications apparatus is provided. The communications apparatus may be a terminal device, and the communications apparatus includes a communications interface, a processor, and a memory. The communications interface is configured to obtain a TA adjustment parameter from an access network device, and send the TA adjustment parameter to the processor. The TA adjustment parameter is used to indicate a TA adjustment of the terminal device. The memory stores instructions, and when the processor invokes and executes the instructions, after receiving the TA adjustment parameter, the processor is enabled to determine a TA scaling factor of the terminal device, a subcarrier spacing parameter of the terminal device, and a first TA used when the terminal device communicates with the access network device before receiving the TA adjustment parameter. The TA scaling factor is used to perform scaling processing on the TA adjustment of the terminal device. The processor is further configured to determine a second TA based on the TA adjustment parameter, the TA scaling factor, the subcarrier spacing parameter, and the first TA.

In an embodiment of the fifth aspect of this application, the processor is specifically configured to calculate $TA_2$ by using a formula $TA_2 = TA_1 + k \cdot (T_A - 31) \cdot 16 \cdot 64 / 2^\mu$.

$TA_1$ is the first TA, $T_A$ is the TA adjustment parameter, k is the TA scaling factor, $2^\mu$ is the subcarrier spacing parameter, $\Delta f = 2^\mu \cdot 15$ [kHz], and $\Delta f$ is a subcarrier spacing of the terminal device.

In an embodiment of the fifth aspect of this application, the processor is specifically configured to determine the TA scaling factor based on a maximum moving speed of the terminal device, a moving speed of the access network device, and a frequency at which the access network device indicates the terminal device to adjust a TA.

In an embodiment of the fifth aspect of this application, the processor is specifically configured to calculate the TA scaling factor k by using a formula $2(v_1+v_2)/f_{TA}/c=k \cdot 32 \cdot 16 \cdot 64 \cdot T_c/8$.

$v_1$ is the maximum moving speed of the terminal device, $v_2$ is the moving speed of the access network device, $f_{TA}$ is the frequency at which the access network device indicates the terminal device to adjust the TA, c is a lightspeed, and $T_c$ is a basic time unit.

In an embodiment of the fifth aspect of this application, the processor is further configured to: determine whether the TA adjustment of the terminal device processed by the TA scaling factor meets a preset condition; and if the TA adjustment of the terminal device meets the preset condition, determine the second TA based on the TA adjustment parameter, the TA scaling factor, the subcarrier spacing parameter, and the first TA.

In an embodiment of the fifth aspect of this application, the processor is specifically configured to determine the TA scaling factor based on the moving speed of the access network device, a height of the access network device, and a height timing advance of the access network device.

In an embodiment of the fifth aspect of this application, the processor is specifically configured to determine, by searching a first mapping relationship, the TA scaling factor corresponding to the moving speed of the access network device, the height at which the access network device is located, and the height timing advance of the access network device. The first mapping relationship includes a correspondence between at least one of the moving speed of the access network device, the height of the access network device, and the height timing advance of the access network device, and the TA scaling factor.

In an embodiment of the fifth aspect of this application, the processor is specifically configured to determine, by searching a second mapping relationship, the TA scaling factor corresponding to the subcarrier spacing of the terminal device, the moving speed of the access network device, the height at which the access network device is located, and the height timing advance of the access network device. The second mapping relationship includes a correspondence between at least one of the subcarrier spacing of the terminal device, the moving speed of the access network device, the height of the access network device, and the height timing advance of the access network device, and the TA scaling factor.

In an embodiment of the fifth aspect of this application, the processor is specifically configured to determine the TA scaling factor based on a format of a random access preamble used by the terminal device in a process of randomly accessing the access network device.

In an embodiment of the fifth aspect of this application, the processor is further configured to determine the second TA based on a TA offset parameter, the TA adjustment parameter, the TA scaling factor, the subcarrier spacing parameter, and the first TA. The TA offset parameter is used to perform offset processing on the TA adjustment of the terminal device.

In an embodiment of the fifth aspect of this application, the processor is specifically configured to determine the TA scaling factor based on attribute information of the access network device.

In an embodiment of the fifth aspect of this application, the communications interface is further configured to receive indication information sent by the access network device and send the indication information to the processor. The indication information is used to indicate a common delay of a cell in which the terminal device is located.

In an embodiment of the fifth aspect of this application, the processor is further configured to determine the common delay based on the indication information when receiving the indication information.

In an embodiment of the fifth aspect of this application, the communications interface is further configured to: when the terminal device accesses the access network device for a first time, obtain a TA initial parameter from the access network device and send the TA initial parameter to the processor.

The processor is further configured to determine an initial TA based on the common delay, the TA initial parameter, and the subcarrier spacing parameter when receiving the TA initial parameter.

In an embodiment of the fifth aspect of this application, the common delay includes the height timing advance of the access network device and an angular timing advance of the cell in which the terminal device is located.

In an embodiment of the fifth aspect of this application, the processor is further configured to: if the terminal device is in a static state, determine a TA drift rate of the terminal device. The TA drift rate is used to indicate a TA adjustment that is in the cell in which the terminal device is located and that is caused by movement of the access network device.

The processor is further configured to determine a fourth TA based on the TA drift rate, a third TA, the TA adjustment parameter, and the subcarrier spacing parameter. The third TA is a TA used when the terminal device communicates with the access network device before determining the fourth TA.

In an embodiment of the fifth aspect of this application, the processor is further configured to calculate the fourth TA by using a formula $TA_4=TA_3+\Delta N_{TA}+\Delta N_{TA}' \cdot \Delta t$. $\Delta N_{TA}=(T_A-31) \cdot 16 \cdot 64/2^\mu$, $T_A$ is the TA adjustment parameter sent by the access network device, $\Delta N_{TA}'$, A is the TA adjustment, $\Delta t=t1-t0$, to is a time at which the terminal device receives the TA adjustment parameter, and t1 is a time at which the terminal device is to send uplink communication data to the access network device.

In an embodiment of the fifth aspect of this application, the processor is further configured to determine the TA drift rate of the terminal device according to a third mapping relationship. The third mapping relationship includes a correspondence between a Doppler frequency shift of at least one access network device and the TA drift rate of the terminal device.

According to a sixth aspect of this application, a communications apparatus is provided. The communications apparatus may be an access network device, and more specifically, the communications apparatus may be a radar base station. The communications apparatus includes a communications interface, a processor, and a memory. The memory stores instructions, and when the processor invokes and executes the instructions, the processor is enabled to determine a TA adjustment parameter of a terminal device, and send the TA adjustment parameter to the communications interface. The TA adjustment parameter is used to indicate a TA adjustment of the terminal device. When receiving the TA adjustment parameter, the communications interface sends the TA adjustment parameter to the terminal device, so that the terminal device determines a second TA based on the TA adjustment parameter, a TA scaling factor, a subcarrier spacing parameter, and a first TA. The TA scaling factor is used to perform scaling processing on the TA adjustment of the terminal device, and the first TA is a TA used when the terminal device communicates with the access network device before receiving the TA adjustment parameter.

In an embodiment of the sixth aspect of this application, the communications interface is further configured to send indication information to the terminal device, where the indication information is used to indicate a common delay of a cell in which the terminal device is located.

In an embodiment of the sixth aspect of this application, the common delay includes a height timing advance of the access network device and an angular timing advance of the cell in which the terminal device is located.

In an embodiment of the sixth aspect of this application, the communications interface is specifically configured to: broadcast the common delay in the cell in which the terminal device is located; or broadcast the height timing advance in a coverage area of the access network device and broadcast the angular timing advance in the cell in which the terminal device is located.

According to a seventh aspect, an embodiment of this application further provides a computer-readable storage medium, including instructions. When the instructions are run on a computer, the computer is enabled to perform the method according to the first aspect of this application.

According to an eighth aspect, an embodiment of this application further provides a computer-readable storage medium, including instructions. When the instructions are run on a computer, the computer is enabled to perform the method according to the second aspect of this application.

According to a ninth aspect, an embodiment of this application provides a communications system. The system includes the apparatus according to the third aspect and the apparatus according to the fourth aspect; or the system includes the communications apparatus according to the fifth aspect and the communications apparatus according to the sixth aspect.

DESCRIPTION OF EMBODIMENTS

Figure 1:
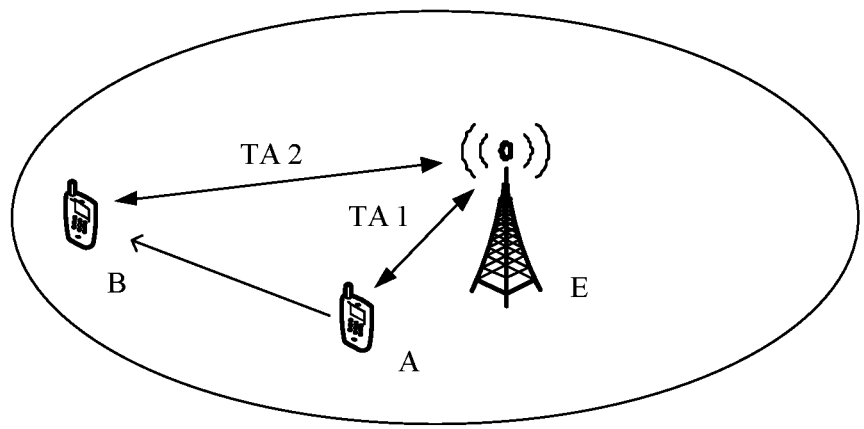
FIG. 1 is a schematic diagram of a communications system according to a conventional technology.

FIG. 1 is a schematic diagram of a communications system according to the conventional technology. A communication scenario shown in FIG. 1 includes a terminal device A, a terminal device B, and an access network device. After establishing a communication connection to the access network device, the terminal device may further communicate with a core network by using the access network device. For example, in an example shown in FIG. 1, it is shown that when the access network device is a base station E, within a coverage area of the base station E, both the terminal device A and the terminal device B may access the base station E, and communicate with the base station E by using an established wireless connection relationship. The communication includes: A terminal device sends uplink communication data to a base station, and the base station sends uplink communication data to a terminal.

In the conventional technology, when a distance between a terminal device and a base station is relatively long, a relatively large transmission delay exists when the terminal device sends uplink communication data to the base station, and different transmission delays exist in uplink communication data sent by different terminal devices to the base station within a coverage area of the base station. For example, in an example shown in FIG. 1, a transmission delay TA 1 exists in uplink communication data sent by the terminal device A to the base station E, and a transmission delay TA 2 exists in uplink communication data sent by the terminal device B to the base station E. Because a distance between the terminal device B and the base station E is greater than a distance between the terminal device A and the base station, the transmission delay TA 2 is greater than the transmission delay TA 1. Therefore, to ensure time synchronization of uplink communication data of a terminal device received by a base station side, the base station sets a timing advance (TA) for each accessed terminal device, so that the terminal device can obtain, by using the TA, a negative offset between a first time at which the terminal device receives downlink communication data sent by the base station and a second time at which the terminal device sends uplink communication data to the base station. In this way, the base station controls, by controlling time at which the accessed terminal device sends the uplink communication data, time at which the base station receives the uplink communication data of the terminal device.

For example, in some embodiments, when the terminal device randomly accesses the base station, the base station determines a TA of the terminal device based on a random access preamble sent by the terminal device, and sends a TA initial parameter to the terminal device by using a TAC field, so that the terminal device can determine an initial TA based on the TA initial parameter. However, because of mobility of the terminal device, after the terminal device determines the initial TA, the base station further needs to continuously indicate the terminal device to adjust the TA of the terminal device. After receiving the uplink communication data sent by the terminal device, the base station determines, by measuring a related parameter of the uplink communication data, a TA adjustment for adjusting the TA of the terminal device, and also sends a TA adjustment parameter to the terminal device by using a TAC field, so that the terminal device can adjust the TA based on the TA adjustment parameter.

Figure 2:
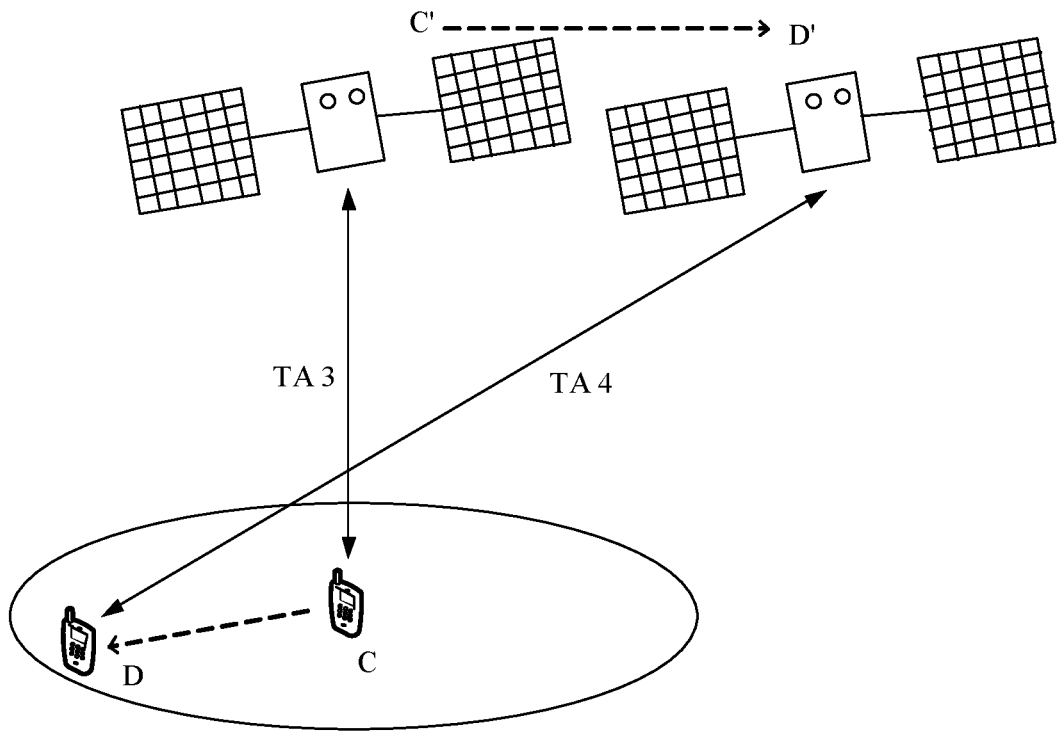
FIG. 2 is a schematic diagram of a communications system according to this application.

FIG. 2 is a schematic diagram of a communications system to which this application is applied. An application scenario shown in FIG. 2 is a communication scenario of a satellite base station. The communications system includes a satellite base station and at least one terminal device. Alternatively, in some embodiments, the communications system shown in FIG. 2 further includes a ground base station that is not shown. The ground base station and the satellite base station jointly provide services for the terminal device. The satellite base station has wider coverage, and is not susceptible to damage by natural disasters or external forces. Therefore, the satellite base station can provide communications services for some areas, for example, ocean or a forest, that cannot be covered by a ground communications network, and has features such as wide coverage, reliability, multi-connections, and high throughput.

In embodiments of this application, the terminal device may also be referred to as a terminal. The terminal device may be user equipment (UE), a mobile station (MS), a mobile terminal device (MT), or the like. The terminal device may also be a mobile phone, a tablet computer (Pad), a computer with a wireless transceiver function, a virtual reality (VR) terminal device, an augmented reality (AR) terminal device, a wireless terminal device in industrial control, a wireless terminal device in self driving, a wireless terminal device in remote medical surgery, a wireless terminal device in a smart grid, a wireless terminal device in transportation safety, a wireless terminal device in a smart city, a wireless terminal device in a smart home, or the like.

Because a distance between the terminal device and the satellite base station is relatively long, the satellite base station also needs to indicate each terminal device that accesses the satellite base station to determine a TA of the terminal device, to control time synchronization of uplink communication data of the terminal device received by a base station. However, in the conventional technology shown in FIG. 1, a location of the base station E in a ground communications network is fixed, and only mobility of the terminal device is considered when the terminal device determines the TA. In a communications system, for example, a 5th generation mobile networks new radio access technology (5G NR), an adjustment range each time the base station in the ground communications network adjusts the TA of the terminal device and a total range that can be adjusted in a period of time are limited.

In the communication scenario shown in FIG. 2, an existing satellite base station is generally in a continuously moving state, for example, at a first moment, a terminal device C is at a location C in the figure, and the satellite base station is at a location C' in the figure. In this case, a transmission delay of a TA 3 occurs in uplink communication data sent by the terminal device to the satellite base station. Therefore, the terminal device needs to send the uplink communication data in advance by using a timing advance of the TA 3. However, at a second moment, because the terminal device moves from the location C to a location D, and the satellite base station moves from the location C' to D', a transmission delay of a TA 4 occurs in uplink communication data sent by the terminal device to the satellite base station. Therefore, the terminal device needs to send the uplink communication data in advance by using a timing advance of the TA 4. Obviously, because a distance between the location D and the location D' is greater than a distance between the location C and the location C', the TA 4>the TA 3.

For example, in the 5G NR communications system, when the terminal device determines the TA, both a frequency for determining the TA and a maximum TA adjustment at one time are limited, and mobility of the base station is not considered. However, in the satellite communications system shown in FIG. 2, because the satellite base station itself also has mobility, and a moving speed of the satellite base station is far greater than a moving speed of the terminal device, an existing TA determining method for a terminal device cannot be directly applied to the satellite base station. Therefore, how to enable the TA determining method for a terminal device to be applied to the satellite base station is a technical problem to be urgently resolved in this field.

The following describes a TA determining method for a terminal device provided by this application with reference to accompanying drawings.

Figure 3:
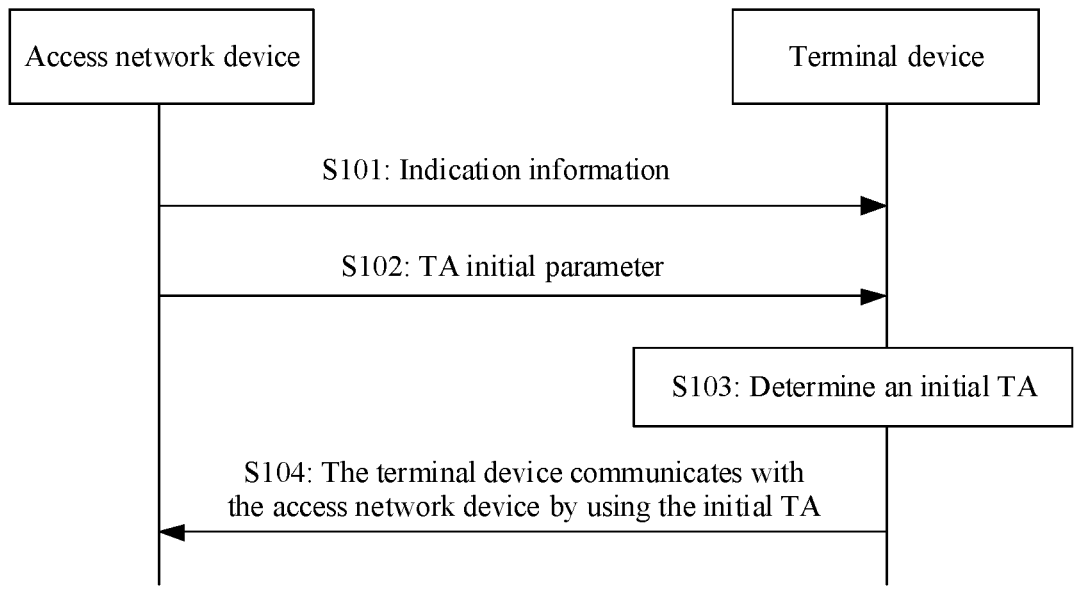
FIG. 3 is a schematic flowchart of an embodiment of a TA determining method for a terminal device according to this application.

FIG. 3 is a schematic flowchart of an embodiment of a TA determining method for a terminal device according to this application. As shown in FIG. 3, the TA determining method for a terminal device according to an embodiment of this application includes following steps.

S101: An access network device sends indication information to a terminal device.

For example, the access network device in this embodiment includes a satellite base station. In this case, to compensate for a TA value when determining an initial TA in a process in which the terminal device accesses the satellite base station, the access network device needs to send, to the terminal device, indication information that can indicate a common delay of a cell in which the terminal device is located.

The common delay in this embodiment includes a height timing advance TA (h) of the access network device and an angular timing advance TA (θ) of the cell in which the terminal device is located.

Figure 4:
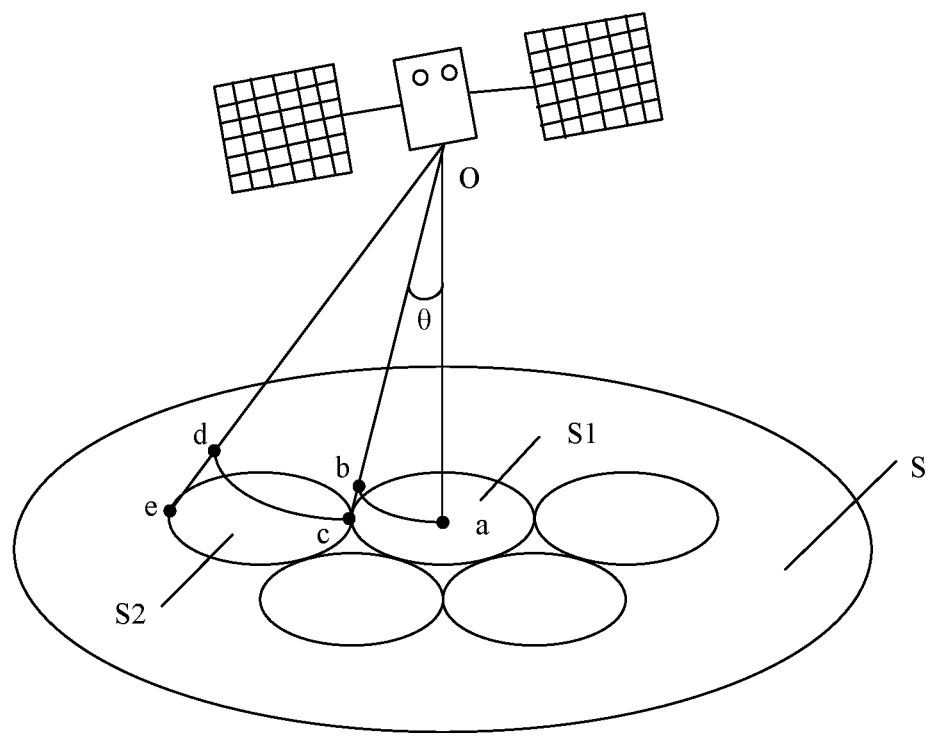
FIG. 4 is a schematic diagram of a common delay of a cell in which a terminal device is located according to this application.

For example, FIG. 4 is a schematic diagram of a common delay of a cell in which a terminal device is located according to this application. In coverage S of a satellite base station O in FIG. 4, common delays of different cells are different.

A cell S1 directly below the satellite base station O is used as an example. When a terminal device located at a point a directly below the satellite base station O in the cell sends uplink communication data to the satellite base station O, a time delay exists between a and O due to a height h of the satellite base station O. In this embodiment, the time delay is denoted as a high timing advance TA (h). In other words, when all terminal devices within the coverage S of the satellite base station O send uplink communication data to the satellite base station O, at least the common delay exists, and compensation of TA (h) needs to be performed.

In addition to the cell S1 located directly below the satellite base station O, when sending uplink communication data to the satellite base station, a terminal device in another cell within the coverage S further needs to consider an angular timing advance of each cell. For example, a base station S2 shown in FIG. 4 is used as an example. A point c in the cell is a location closest to the point a directly below the satellite base station O. When a terminal device is located at the location c, the height timing advance TA (h) brought by the height h of the satellite base station exists, and an angular timing advance TA (θ) brought by an angle θ between the point c and the satellite base station O also exists. In other words, when the terminal device at the point c sends uplink communication data to the satellite base station O, a common delay that needs to be compensated between c and O includes a height timing advance TA (h) between O and b and an angular timing advance TA (θ) between b and c. Therefore, when all terminal devices in the cell S2 send uplink communication data to the satellite base station, the common delay exists, and compensation of a common delay, that is TA (h)+TA (θ), needs to be performed.

Figure 5:
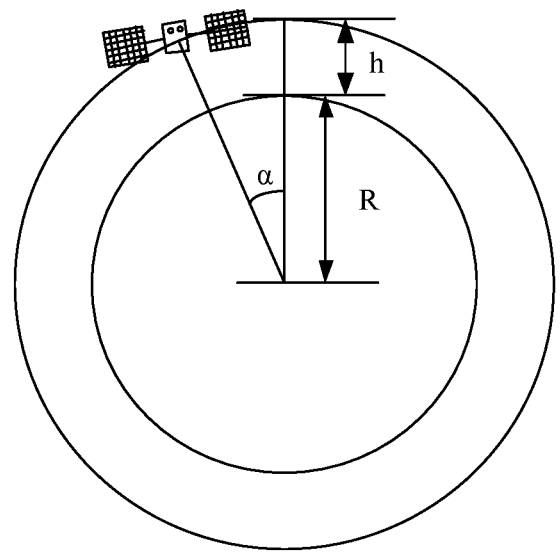
FIG. 5 is a schematic diagram of a location of a satellite base station according to this application.
Figure 6:
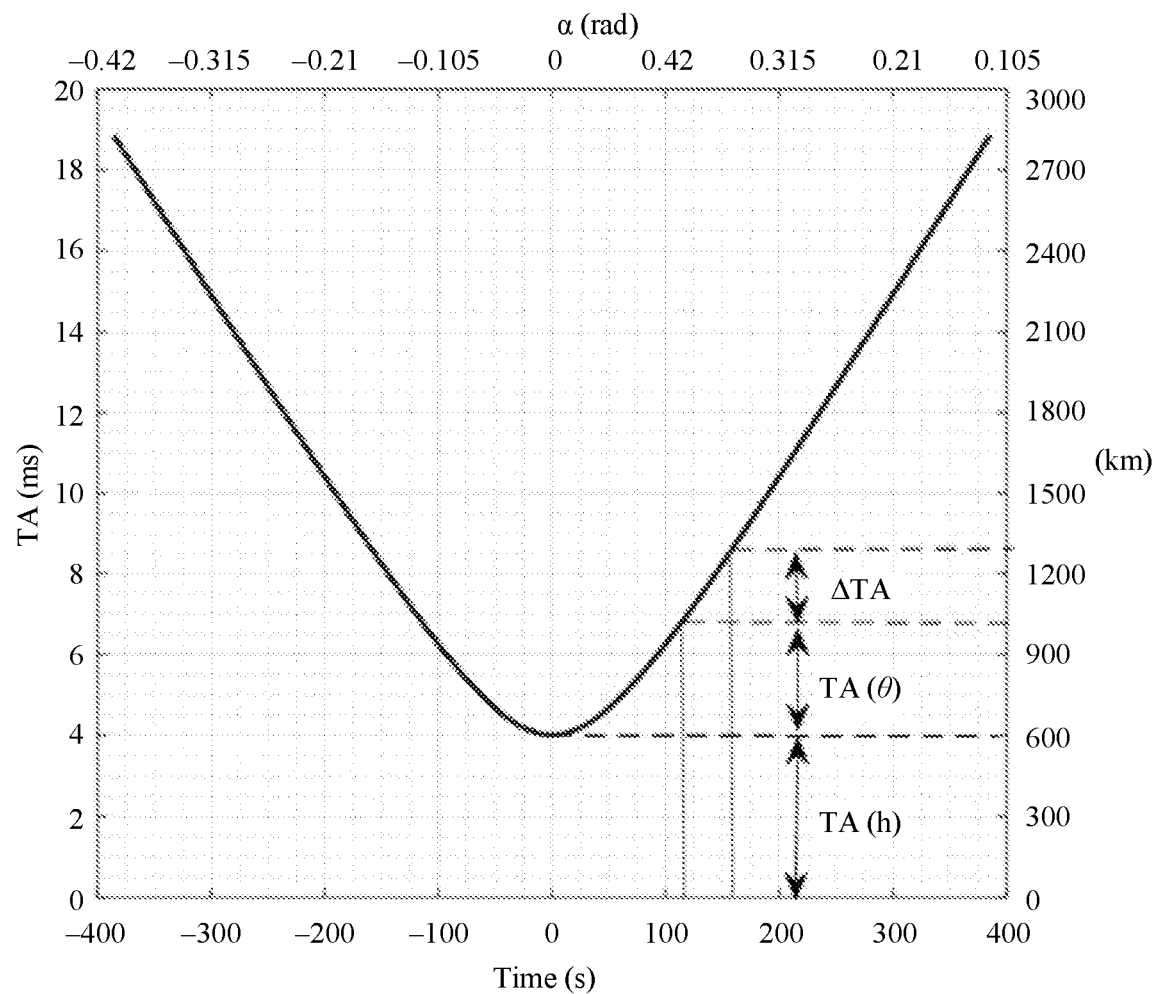
FIG. 6 is a schematic diagram of a correspondence between a location of a satellite base station and a TA of a terminal device according to this application.

However, distances between the terminal devices in the cell S2 and the point a are not completely the same, and different distances cause different TA compensation values needed by different terminal devices in a same cell. For example, a point e is a location in the cell S2 farthest from the point a. In addition to performing the compensation of TA (h)+TA (θ) at the point e, the terminal device further needs to perform compensation of ΔTA on the terminal device. Finally, for the terminal device in the cell S2, TA compensation required by a radar base station includes TA (h)+TA (θ)+ΔTA. For example, FIG. 5 is a schematic diagram of a location of a satellite base station according to this embodiment, where R is a radius of the Earth, and h is an orbital height at which the satellite base station moves around the Earth. For a change relationship between the location of the satellite base station and a TA when the satellite base station moves around the Earth and represents an angle α with an initial location, refer to FIG. 6. FIG. 6 is a correspondence between a location of a satellite base station and a TA of a terminal device in this application. As shown in FIG. 6, for a cell within coverage of a satellite base station at a moment of 150s in the figure, a height of about 1300 km, and an angle α of about 0.33 rad, a TA of a terminal device in the cell includes TA (h)+TA (0)+ΔTA. Optionally, when the terminal device accesses the satellite base station, the satellite base station sends ΔTA to the terminal device, to compensate the TA of the terminal device.

Therefore, in S101, to enable the terminal device to determine a common delay that needs to be compensated when communicating with the satellite base station, the satellite base station needs to send indication information to a terminal device within coverage of the satellite base station, so that the terminal device may determine, based on the indication information, the common delay of the located cell.

Optionally, in an embodiment of S101, the satellite base station may broadcast, in each cell, a common delay corresponding to the cell. For example, in the scenario shown in FIG. 4, the satellite base station O broadcasts, in the cell S1, a common delay TA (h) corresponding to the cell S1, and broadcasts, in the cell S2, a common delay TA (h)+TA (θ) corresponding to the cell S2.

Alternatively, in another embodiment of S101, because all terminal devices within the coverage S of the satellite base station O have a delay of TA (h), the satellite base station O may broadcast the TA (h) within the coverage S of the satellite base station O, and broadcast, in each cell, a TA (θ) corresponding to the cell.

Alternatively, in another embodiment of S101, the satellite base station may indicate a common delay of a located cell to the terminal device in an implicit indication manner. For example, if a correspondence exists between a cell ID or a radar beam (beam) ID of the satellite base station and a common delay in a cell, the indication information may be a cell ID or a beam ID sent by the satellite base station to the terminal device, so that the terminal device determines a corresponding common delay based on the cell ID or the beam ID sent by the satellite base station. The correspondence may be sent by the satellite base station to the terminal device, the correspondence may be obtained through negotiation between the satellite base station and the terminal device, or the correspondence may be stored in the terminal device.

S102: The access network device sends a TA initial parameter to the terminal device, so that the terminal device determines the initial TA.

For example, when accessing the access network device for a first time, the terminal device may obtain the TA initial parameter from the access network device. For example, in a process in which the terminal device randomly accesses the radar base station, the radar base station sends a TA initial parameter to the terminal device by using a TAC (timing advance command) field in a random access response (RAR) message, where the TA initial parameter includes 12 bits, and the TA initial parameter ranges from 0 to 3846.

S103: The terminal device jointly determines the initial TA based on the indication information and the TA initial parameter.

For example, the terminal device may obtain the initial TA by using a formula $N_{T40}=TA(h)+TA(\theta)+T_{AD}\cdot 16\cdot 64/2^{\mu}$, where TA (h)+TA (θ) is the common delay, $T_{AO}$ is the TA initial parameter, and $2^{\mu}$ is a subcarrier spacing parameter. For the subcarrier spacing parameter, $\Delta f=2^{\mu}\cdot 15$ [kHz], where Δf is a subcarrier spacing of the terminal device, and a time unit of $N_{T40}$ is Tc=0.509 ns, which is a basic time unit defined in the TS 38.211 standard.

S104: The terminal device communicates with the access network device by using the initial TA.

The terminal device may communicate with the access network device by using the initial TA after determining the initial TA of the terminal device through the foregoing steps. For example, when the access network device is the radar base station, the communication means that the terminal device needs to send uplink transmission data to the radar base station a TA time period in advance.

In conclusion, in the TA determining method for a terminal device provided in this embodiment, the terminal device can jointly determine the initial TA of the terminal device based on the common delay indicated by the access network device and the TA initial parameter. Because the terminal device can determine the initial TA based on the common delay indicated by the access network device, the TA determining method for a terminal device can be applied to the radar base station, so that the radar base station compensates the TA of the terminal device based on a height of the radar and an angle of the cell.

Figure 7:
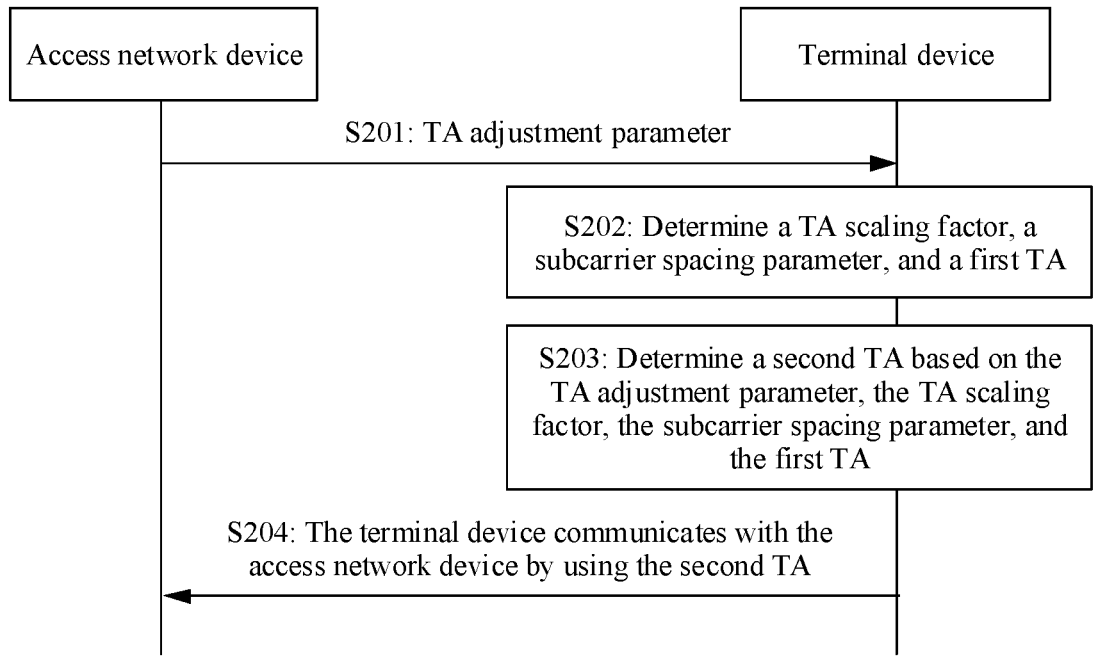
FIG. 7 is a schematic flowchart of an embodiment of a TA determining method for a terminal device according to this application.

Subsequently, after the terminal device performs random access and determines the initial TA, because both the terminal device and the access network device in this embodiment have mobility, the terminal device needs to continuously adjust the TA subsequently, to meet a real-time TA requirement. FIG. 7 is a schematic flowchart of an embodiment of a TA determining method for a terminal device according to this application. FIG. 7 shows a process of subsequently adjusting a TA after a terminal device has randomly accessed an access network device and obtained an initial TA. This embodiment may be applied to the communication scenario shown in FIG. 2. The access network device is a radar base station. The method includes following steps.

S201: The access network device sends a TA adjustment parameter to the terminal device. The TA adjustment parameter is used to indicate a TA adjustment of the terminal device.

For example, in this embodiment, in a process of communicating with the terminal device, the access network device may measure received uplink communication data sent by the terminal device, and when determining that a TA of the terminal device needs to be adjusted, send the TA adjustment parameter to the terminal device, so that the terminal device adjusts the TA of the terminal device based on the TA adjustment parameter. Optionally, in this step, a TAC sent by the access network device to the terminal device carries the TA adjustment parameter, where the TA adjustment parameter includes 6 bits, and the TA adjustment parameter ranges from 0 to 63.

S202: The terminal device determines a TA scaling factor, a subcarrier spacing parameter, and a first TA.

Then, after receiving the TA adjustment parameter sent by the access network device in S201, the terminal device determines to adjust the TA. In this case, the terminal device needs to determine the TA scaling factor, the subcarrier spacing parameter, and the first TA required for calculating the TA in S202. The TA scaling factor is used to perform scaling processing on the TA adjustment of the terminal device. The first TA is a TA used when the terminal device communicates with the access network device before receiving the TA adjustment parameter. The first TA may be the initial TA, or the first TA may be a TA obtained after the initial TA is adjusted.

S203: The terminal device jointly determines a second TA based on the TA adjustment parameter, the TA scaling factor, the subcarrier spacing parameter, and the first TA.

Specifically, in this step, the terminal device calculates $TA_2$ by using a formula $TA_2=TA_1+k\cdot(T_A-31)\cdot 16\cdot 64/2^\mu$. TA is the TA adjustment parameter received in S201, $TA_1$ is the first TA determined in S202, k is the TA scaling factor determined in S202, and $2^\mu$ is the subcarrier spacing parameter determined in S202. For the subcarrier spacing parameter, $\Delta f=2^\mu\cdot 15$ [kHz], where $\Delta f$ is the subcarrier spacing of the terminal device.

S204: The terminal device communicates with the access network device by using the second TA.

Finally, the terminal device communicates with the access network device by using the second TA determined in the foregoing steps. The communication means that the terminal device needs to send uplink transmission data to the access network device a second TA time period in advance. It may be understood that, in the embodiment shown in FIG. 7, before receiving the TA adjustment parameter sent by the access network device in S201, the terminal device sends the uplink transmission data to the access network device a first TA time period in advance. After determining the TA adjustment parameter in S203, the terminal device sends the uplink transmission data to the access network device the second TA time period in advance.

In conclusion, in the TA determining method for a terminal device provided in this application, after receiving the TA adjustment parameter sent by the access network device and determining that the TA of the terminal device needs to be adjusted, the terminal device determines the TA scaling factor, the subcarrier spacing parameter, and the first TA, to jointly adjust the first TA to obtain the second TA. In this embodiment, when the terminal device determines the second TA in S203, an adjustment that may be adjusted based on the first TA is $k\cdot(T_A-31)\cdot 16\cdot 64/2^\mu$. Compared with an adjustment $(T_A-31)\cdot 16\cdot 64/2^\mu$ specified in an existing 5G NR system, the TA adjustment parameter k is added, so that an adjustable range is larger when the terminal device adjusts the TA. Therefore, the TA may be applied to, the satellite communications system shown in FIG. 2, to adjust the TA in a case of mobility caused by both the terminal device and the satellite base station. In addition, the TA determining method for a terminal device in this embodiment may be further applied to an existing ground communications system shown in FIG. 1, and the terminal device may adjust the TA only in consideration of mobility of the terminal device. Therefore, the TA determining method for a terminal device provided in this embodiment may be further applied to both a ground fixed base station and the satellite base station, and is portable.

Optionally, based on the embodiment shown in FIG. 7, in S202, in an embodiment of determining the TA scaling factor k, the terminal device specifically determines the TA scaling factor k based on a maximum moving speed of the terminal device, a moving speed of the access network device, and a frequency at which the access network device indicates the terminal device to adjust the TA. For example, the terminal device may calculate the TA scaling factor k by using a formula $2(v_1+v_2)/f_{TA}/c=k\cdot 32\cdot 16\cdot 64\cdot T_c/8$, where $v_1$ is the maximum moving speed of the terminal device, $v_2$ is the moving speed of the access network device, $f_{TA}$ is the frequency at which the access network device indicates the terminal device to adjust the TA, c is a lightspeed, a typical value of the lightspeed is 299792458 m/s, and $T_c$ is a basic time unit.

Optionally, $f_{TA}$ may be determined by the terminal device based on a satellite type of an accessed access network device without being directly indicated by the access network device. Satellite types may be a low-orbit type, a middle-orbit type, a high-orbit type, and the like that are classified by a satellite base station based on running heights. Satellites running in different orbits have different operating parameters, and need to correspond to different frequencies to adjust a TA. Therefore, after accessing the satellite base station, the terminal device may determine, based on a type of the satellite base station, $f_{TA}$ corresponding to the current satellite base station. Alternatively, after determining an operating parameter of the satellite base station based on the type of the satellite base station, the terminal device may further determine, based on the operating parameter, $f_{TA}$ corresponding to the satellite base station. Optionally, the satellite type, the operating parameter, and a correspondence between the operating parameter and $f_{TA}$ may be stored in the access network device and/or the terminal device in a form of a table. Alternatively, the access network device and/or the terminal device may directly store a table used to indicate a correspondence between the satellite type and $f_{TA}$.

A value of the TA scaling factor k may be represented based on a maximum TA change that needs to be adjusted by the terminal device each time the TA is adjusted, and when an elevation angle of the terminal device is maximum when the terminal device communicates with the access network device and a movement direction of the terminal device is opposite to that of the access network device, the TA that needs to be adjusted by the terminal device is maximum. Therefore, in the foregoing formula, a sum of the maximum movement speed of the terminal device and the movement speed of the access network device needs to be considered. In this case, a TA change speed is maximum. When the access network device is the radar base station, because a running height of the radar base station is known, a speed $v_2$ of the radar base station may be calculated by using a formula $v_2=\sqrt{GM/(R+h)}$. The universal gravitational constant $G=6.67*10^{-11}$ N m/kg, an Earth weight $M=5.965*10^{24}$ kg, an Earth radius $R=6371$ km, and the running height of the radar base station is h. The running height h of the radar base station may be obtained by a formula TA (h)=2h/c, where TA (h) is a height timing advance of a common delay sent by the radar base station received by the terminal device. Optionally, in S203 in this embodiment, after accessing the access network device, the terminal device may determine the subcarrier spacing used during communication of the terminal device, and the frequency at which the access network device indicates the terminal device to adjust the TA. The frequency to adjust the TA is the frequency at which the access network device sends the TA adjustment parameter to the terminal device shown in FIG. 7.

Further, based on the foregoing embodiment, when the terminal device works at a maximum subcarrier spacing of the terminal device, a TA range that can be indicated by the TA adjustment parameter sent by the access network device to the terminal device is minimum. However, the TA scaling factor k obtained through calculation by using the foregoing formula is based on the maximum subcarrier spacing of the terminal device, and therefore, another subcarrier spacing of the terminal device can be met. However, when the subcarrier spacing is reduced, the TA scaling factor k is still used, and TA adjustment precision is reduced to some extent. Therefore, in this embodiment, it may be further determined that a TA adjustment range cannot be met when the TA scaling factor k is not added to the TA adjustment parameter. For example, it is determined whether the TA adjustment obtained after TA scaling factor processing meets a preset condition. Only when $2(v_1+v_2)/f_{T4}/c > k \cdot 32 \cdot 16 \cdot 64 \cdot T_c/8$, the foregoing formula may be used to adjust the TA. When $2(v_1+v_2)/f_{T4}$ c≤k·32·16·64·$T_c$/8, the formula $TA_2=TA_1+(T_A-31)\cdot 16\cdot 64/2^u$ is used to adjust the TA. In this way, when the subcarrier spacing of the terminal device is relatively small, the TA scaling factor is not added to the TA adjustment, but the TA is directly adjusted based on the TA adjustment, to improve a TA adjustment precision of the terminal device when the subcarrier spacing is relatively small.

In another embodiment of determining the TA scaling factor in S202, the terminal device specifically determines the TA scaling factor by using the moving speed of the access network device, a height at which the access network device is located, and a height timing advance of the access network device. For example, the terminal device may determine, by searching a first mapping relationship, the TA scaling factor corresponding to the moving speed of the access network device, the height at which the access network device is located, and the height timing advance of the access network device, where the first mapping relationship includes a correspondence between at least one of the moving speed of the access network device, the height of the access network device, and the height timing advance of the access network device, and the TA scaling factor.

For example, the terminal device may store the first mapping relationship in a table. For a specific configuration manner of the table, refer to Table 1. Different correspondences listed in Table 1 are merely examples for description, but are not limited to the correspondences. In Table 1, the frequency that the access network device indicates the terminal device to adjust the TA $f_{T4}=5$, that is, the TA is adjusted every 200 ms, and a maximum moving speed of the terminal device is 1000 km/h. Therefore, it may be understood that if a correspondence between a moving speed of another access network device, the height of the access network device, the height timing advance of the access network device, and the TA scaling factor is obtained due to a change of another parameter, for example, a frequency to adjust the TA or a moving speed of the terminal device, and if the correspondence changes only in a numerical value, the correspondence also falls within the protection scope of this application.

TABLE 1

| Height at which an access network device is located (km) | Moving speed of an access network device | Height timing advance TA (h) | TA scaling factor k |
|---|---|---|---|
| 300 | 7.72276235 | 2 | 5.120673 |
| 400 | 7.665521994 | 2.666667 | 5.084037 |
| 500 | 7.609535837 | 3.333333 | 5.048204 |
| 600 | 7.554758737 | 4 | 5.013144 |
| 700 | 7.501147793 | 4.666667 | 4.978831 |
| 800 | 7.448662207 | 5.333333 | 4.945238 |
| 900 | 7.397263151 | 6 | 4.912341 |
| 1000 | 7.346913647 | 6.666667 | 4.880115 |
| 1100 | 7.297578456 | 7.333333 | 4.848538 |
| 1200 | 7.249223971 | 8 | 4.817589 |
| 1300 | 7.201818127 | 8.666667 | 4.787248 |
| 1400 | 7.155330305 | 9.333333 | 4.757494 |
| 1500 | 7.109731253 | 10 | 4.728308 |
| 1600 | 7.064993008 | 10.66667 | 4.699674 |
| 1700 | 7.021088823 | 11.33333 | 4.671574 |
| 1800 | 6.977993101 | 12 | 4.643991 |
| 1900 | 6.935681329 | 12.66667 | 4.616909 |
| 2000 | 6.894130024 | 13.33333 | 4.590315 |
| 2100 | 6.853316677 | 14 | 4.564193 |
| 2200 | 6.813219699 | 14.66667 | 4.538529 |
| 2300 | 6.773818376 | 15.33333 | 4.51331 |
| 2400 | 6.735092822 | 16 | 4.488524 |
| 2500 | 6.697023939 | 16.66667 | 4.464159 |
| 2600 | 6.659593375 | 17.33333 | 4.440202 |
| 2700 | 6.62278349 | 18 | 4.4166425 |
| 2800 | 6.586577318 | 18.66667 | 4.393468 |
| 2900 | 6.550958533 | 19.33333 | 4.370671 |
| 3000 | 6.515911425 | 20 | 4.348239 |
| 3100 | 6.481420862 | 20.66667 | 4.326164 |
| 3200 | 6.447472268 | 21.33333 | 4.304439 |
| 3300 | 6.414051598 | 22 | 4.283045 |
| 3400 | 6.381145309 | 22.66667 | 4.261984 |
| 3500 | 6.34874034 | 23.33333 | 4.241243 |
| 3600 | 6.316824089 | 24 | 4.220815 |
| 3700 | 6.285384395 | 24.66667 | 4.200693 |
| 3800 | 6.254409515 | 25.33333 | 4.180867 |
| 3900 | 6.223888108 | 26 | 4.161332 |
| 4000 | 6.193809215 | 26.66667 | 4.142081 |
| 4100 | 6.164162246 | 27.33333 | 4.123105 |
| 4200 | 6.134936961 | 28 | 4.1044 |
| 4300 | 6.106123459 | 28.66667 | 4.085958 |
| 4400 | 6.077712159 | 29.33333 | 4.067774 |
| 4500 | 6.049693791 | 30 | 4.049841 |
| 4600 | 6.022059379 | 30.66667 | 4.032154 |
| 4700 | 5.994800234 | 31.33333 | 4.014707 |
| 4800 | 5.967907939 | 32 | 3.997495 |
| 4900 | 5.941374338 | 32.66667 | 3.980512 |
| 5000 | 5.915191528 | 33.33333 | 3.963754 |
| 5100 | 5.889351847 | 34 | 3.947216 |
| 5200 | 5.863847865 | 34.66667 | 3.930892 |
| 5300 | 5.838672375 | 35.33333 | 3.914779 |
| 5400 | 5.813818387 | 36 | 3.898871 |
| 5500 | 5.789279115 | 36.66667 | 3.883165 |
| 5600 | 5.765047973 | 37.33333 | 3.867656 |
| 5700 | 5.741118565 | 38 | 3.85234 |
| 5800 | 5.717484682 | 38.66667 | 3.837214 |
| 5900 | 5.69414029 | 39.33333 | 3.822272 |
| 6000 | 5.671079526 | 40 | 3.807512 |

Optionally, based on the embodiment shown in Table 1, to reduce storage space occupied when the terminal device stores the table, in this embodiment, heights of the access network device may be classified into different levels, and each level corresponds to one maximum TA scaling factor k. In addition, data in the table may be further processed by rounding up or by precision of 0.5, to reduce the storage space. For example, Table 1.1 and Table 1.2 show two possible manners of compressing Table 1.

TABLE 1.1

| Height at which an access network device is located (km) | Moving speed of an access network device | Height timing advance TA (h) | TA scaling factor k |
|---|---|---|---|
| 300-600 | 7.72-7.55 | 2.00-4.00 | 6 |
| 700-4700 | 7.50-5.99 | 4.67-31.33 | 5 |
| 4800-6000 | 5.97-5.67 | 32.00-40.00 | 4 |
| ... | ... | ... | ... |

TABLE 1.2

| Height at which an access network device is located (km) | Moving speed of an access network device | Height timing advance TA (h) | TA scaling factor k |
|---|---|---|---|
| 300-600 | 7.72-7.55 | 2.00-4.00 | 5.5 |
| 700-2300 | 7.55-6.77 | 4.67-15.33 | 5 |
| 2400-4700 | 6.74-5.99 | 16.00-31.33 | 4.5 |
| 4800-6000 | 5.97-5.67 | 32.00-40.00 | 4 |
| ... | ... | ... | ... |

In the first mapping relationship shown in Table 1, the terminal device works by default by using the maximum subcarrier spacing of the terminal device. To improve precision of adjusting the TA by the terminal device, TA adjustment parameters k corresponding to different subcarrier spacings of the terminal device may be further added according to the first mapping relationship. The terminal device may determine, by searching a second mapping relationship, the TA scaling factor corresponding to the subcarrier spacing of the terminal device, the moving speed of the access network device, the height at which the access network device is located, and the height timing advance of the access network device, where the second mapping relationship includes a correspondence between at least one of the subcarrier spacing of the terminal device, the moving speed of the access network device, the height of the access network device, and the height timing advance of the access network device, and the TA scaling factor.

For example, the terminal device may store the second mapping relationship in a table. For a specific configuration manner of the table, refer to Table 2. Different correspondences listed in Table 2 are merely examples for description, but are not limited to the correspondences. In Table 2, the frequency that the access network device indicates the terminal device to adjust the TA $f_{TA}=5$, that is, the TA is adjusted every 200 ms, and the maximum moving speed of the terminal device is 1000 km/h. Therefore, it may be understood that if a correspondence between a subcarrier spacing, the moving speed of the access network device, the height of the access network device, the height timing advance of the access network device, and the TA scaling factor is obtained due to the change of another parameter, for example, the frequency to adjust the TA or the moving speed of the terminal device, and if the correspondence changes only in a numerical value, the correspondence also falls within the protection scope of this application.

TABLE 2

| Height at which an access network device is located (km) | Moving speed of an access network device | Height timing advance TA (h) | TA scaling factor k (120 kHz subcarrier spacing) | TA scaling factor k (60 kHz subcarrier spacing) | TA scaling factor k (30 kHz subcarrier spacing) | TA scaling factor k (15 kHz subcarrier spacing 15 kHz) |
|---|---|---|---|---|---|---|
| 300 | 7.72276235 | 2 | 5.120673 | 2.560337 | 1.280168 | 0.640084 |
| 400 | 7.665521994 | 2.666667 | 5.084037 | 2.542019 | 1.271009 | 0.635505 |
| 500 | 7.609535837 | 3.333333 | 5.048204 | 2.524102 | 1.262051 | 0.631025 |
| 600 | 7.554758737 | 4 | 5.013144 | 2.506572 | 1.253286 | 0.626643 |
| 700 | 7.501147793 | 4.666667 | 4.978831 | 2.489416 | 1.244708 | 0.622354 |
| 800 | 7.448662207 | 5.333333 | 4.945238 | 2.472619 | 1.23631 | 0.618155 |
| 900 | 7.397263151 | 6 | 4.912341 | 2.45617 | 1.228085 | 0.614043 |
| 1000 | 7.346913647 | 6.666667 | 4.880115 | 2.440057 | 1.220029 | 0.610014 |
| 1100 | 7.297578456 | 7.333333 | 4.848538 | 2.424269 | 1.212135 | 0.606067 |
| 1200 | 7.249223971 | 8 | 4.817589 | 2.408795 | 1.204397 | 0.602199 |
| 1300 | 7.201818127 | 8.666667 | 4.787248 | 2.393624 | 1.196812 | 0.598406 |
| 1400 | 7.155330305 | 9.333333 | 4.757494 | 2.378747 | 1.189373 | 0.594687 |
| 1500 | 7.109731253 | 10 | 4.728308 | 2.364154 | 1.182077 | 0.591039 |
| 1600 | 7.064993008 | 10.66667 | 4.699674 | 2.349837 | 1.174919 | 0.587459 |
| 1700 | 7.021088823 | 11.33333 | 4.671574 | 2.335787 | 1.167893 | 0.583947 |
| 1800 | 6.977993101 | 12 | 4.643991 | 2.321995 | 1.160998 | 0.580499 |
| 1900 | 6.935681329 | 12.66667 | 4.616909 | 2.308455 | 1.154227 | 0.577114 |
| 2000 | 6.894130024 | 13.33333 | 4.590315 | 2.295157 | 1.147579 | 0.573789 |
| 2100 | 6.853316677 | 14 | 4.564193 | 2.282096 | 1.141048 | 0.570524 |
| 2200 | 6.81321969 | 14.66667 | 4.538529 | 2.269264 | 1.134632 | 0.567316 |
| 2300 | 6.773818376 | 15.33333 | 4.51331 | 2.256655 | 1.128328 | 0.564164 |
| 2400 | 6.735092822 | 16 | 4.488524 | 2.244262 | 1.122131 | 0.561066 |
| 2500 | 6.697023939 | 16.66667 | 4.464159 | 2.232079 | 1.11604 | 0.55802 |
| 2600 | 6.659593375 | 17.33333 | 4.440202 | 2.220101 | 1.11005 | 0.555025 |
| 2700 | 6.62278349 | 18 | 4.4166425 | 2.208321 | 1.10416 | 0.55208 |
| 2800 | 6.586577318 | 18.66667 | 4.393468 | 2.196734 | 1.098367 | 0.549184 |
| 2900 | 6.550958533 | 19.33333 | 4.370671 | 2.185335 | 1.092668 | 0.546334 |
| 3000 | 6.515911425 | 20 | 4.348239 | 2.17412 | 1.08706 | 0.54353 |
| 3100 | 6.481420862 | 20.66667 | 4.326164 | 2.163082 | 1.081541 | 0.540771 |
| 3200 | 6.447472268 | 21.33333 | 4.304439 | 2.152218 | 1.076109 | 0.538054 |
| 3300 | 6.414051598 | 22 | 4.283045 | 2.141522 | 1.070761 | 0.535381 |

TABLE 2-continued

| Height at which an access network device is located (km) | Moving speed of an access network device | Height timing advance TA (h) | TA scaling factor k (120 kHz subcarrier spacing) | TA scaling factor k (60 kHz subcarrier spacing) | TA scaling factor k (30 kHz subcarrier spacing) | TA scaling factor k (15 kHz subcarrier spacing 15 kHz) |
|---|---|---|---|---|---|---|
| 3400 | 6.381145309 | 22.66667 | 4.261984 | 2.130992 | 1.065496 | 0.532748 |
| 3500 | 6.34874034 | 23.33333 | 4.241243 | 2.120622 | 1.060311 | 0.530155 |
| 3600 | 6.316824089 | 24 | 4.220815 | 2.110408 | 1.055204 | 0.527602 |
| 3700 | 6.285384395 | 24.66667 | 4.200693 | 2.100346 | 1.050173 | 0.525087 |
| 3800 | 6.254409515 | 25.33333 | 4.180867 | 2.090434 | 1.045217 | 0.522608 |
| 3900 | 6.223888108 | 26 | 4.161332 | 2.080666 | 1.040333 | 0.520167 |
| 4000 | 6.193809215 | 26.66667 | 4.142081 | 2.07104 | 1.03552 | 0.51776 |
| 4100 | 6.164162246 | 27.33333 | 4.123105 | 2.061553 | 1.030776 | 0.515388 |
| 4200 | 6.134936961 | 28 | 4.1044 | 2.0522 | 1.0261 | 0.51305 |
| 4300 | 6.106123459 | 28.66667 | 4.085958 | 2.042979 | 1.02149 | 0.510745 |
| 4400 | 6.077712159 | 29.33333 | 4.067774 | 2.033887 | 1.016943 | 0.508472 |
| 4500 | 6.049693791 | 30 | 4.049841 | 2.02492 | 1.01246 | 0.50623 |
| 4600 | 6.022059379 | 30.66667 | 4.032154 | 2.016077 | 1.008038 | 0.504019 |
| 4700 | 5.994800234 | 31.33333 | 4.014707 | 2.007353 | 1.003677 | 0.501838 |
| 4800 | 5.967907939 | 32 | 3.997495 | 1.998747 | 0.999374 | 0.499687 |
| 4900 | 5.941374338 | 32.66667 | 3.980512 | 1.990256 | 0.995128 | 0.497564 |
| 5000 | 5.915191528 | 33.33333 | 3.963754 | 1.981877 | 0.990939 | 0.495469 |
| 5100 | 5.889351847 | 34 | 3.947216 | 1.973608 | 0.986804 | 0.493402 |
| 5200 | 5.863847865 | 34.66667 | 3.930892 | 1.965446 | 0.982723 | 0.491361 |
| 5300 | 5.838672375 | 35.33333 | 3.914779 | 1.957389 | 0.978695 | 0.489347 |
| 5400 | 5.813818387 | 36 | 3.898871 | 1.949436 | 0.974718 | 0.487359 |
| 5500 | 5.789279115 | 36.66667 | 3.883165 | 1.941582 | 0.970791 | 0.485396 |
| 5600 | 5.765047973 | 37.33333 | 3.867656 | 1.933828 | 0.966914 | 0.483457 |
| 5700 | 5.741118565 | 38 | 3.85234 | 1.92617 | 0.963085 | 0.481543 |
| 5800 | 5.717484682 | 38.66667 | 3.837214 | 1.918607 | 0.959303 | 0.479652 |
| 5900 | 5.69414029 | 39.33333 | 3.822272 | 1.911136 | 0.955568 | 0.477784 |
| 6000 | 5.671079526 | 40 | 3.807512 | 1.903756 | 0.951878 | 0.475939 |

Similarly, based on the embodiment shown in Table 2, to reduce storage space occupied when the terminal device stores the table, in this embodiment, the heights of the access network device may be further classified into different levels, and each level corresponds to one maximum TA scaling factor k. In addition, data in the table may be further processed by rounding up or by precision of 0.5, to reduce the storage space. For example, Table 2.1 and Table 2.2 show two possible manners of compressing Table 2.

TABLE 2.1

| Height at which an access network device is located (km) | Moving speed of an access network device | Height timing advance TA (h) | TA scaling factor k (120 kHz subcarrier spacing) | TA scaling factor k (60 kHz subcarrier spacing) | TA scaling factor k (30 kHz subcarrier spacing) | TA scaling factor k (15 kHz subcarrier spacing) |
|---|---|---|---|---|---|---|
| 300-600 | 7.72-7.55 | 2.00-4.00 | 6 | 3 | 2 | 1 |
| 700-4700 | 7.50-5.99 | 4.67-31.33 | 5 | 3 | 2 | 1 |
| 4800-6000 | 5.97-5.67 | 32.00-40 | 4 | 2 | 1 | 1 |
| . . . | . . . | . . . | . . . | . . . | 1 | 1 |

TABLE 2.2

| Height at which an access network device is located (km) | Moving speed of an access network device | Height timing advance TA (h) | TA scaling factor k (120 kHz subcarrier spacing) | TA scaling factor k (60 kHz subcarrier spacing) | TA scaling factor k (30 kHz subcarrier spacing) | TA scaling factor k (15 kHz subcarrier spacing) |
|---|---|---|---|---|---|---|
| 300-600 | 7.72-7.55 | 2.00-4.00 | 5.5 | 3 | 1.5 | 1 |
| 700-2300 | 7.5-6.77 | 4.67-15.33 | 5 | 2.5 | 1.5 | 1 |
| 2400-4700 | 6.74-5.99 | 16.00-31.33 | 4.5 | 2.5 | 1.5 | 1 |
| 4800-6000 | 5.97-5.67 | 32.00-40 | 4 | 2 | 1 | 1 |
| . . . | . . . | . . . | . . . | . . . | 1 | 1 |

Optionally, in another embodiment of determining the TA scaling factor k in S202, the terminal device may determine the TA scaling factor k based on a format of a random access preamble used by the terminal device in a random access process.

In the random access process of the terminal device, the terminal device sends the random access preamble to the access network device, to request to establish a connection relationship with the access network device. For cells with different radiuses in the coverage of the access network device, formats of random access preambles sent by the terminal device to the access network device in the random access process are different. For example, in the random access process, a terminal device in a cell with a radius of 5 km needs to send a random access preamble in a format 1 to the access network device. However, in the random access process, a terminal device in a cell with a radius of 10 km needs to send a random access preamble in a format 2 to the access network device. In addition, TA adjustment ranges for cells with different radiuses are different. A TA adjustment range for a cell with a larger radius is larger, and a TA adjustment range for a cell with a smaller radius is smaller. Therefore, when the TA of the terminal device is determined, a correspondence may be established between a TA adjustment range of the terminal device, namely, the TA scaling factor k, and the format of the random access preamble, so that the terminal device can determine a corresponding TA scaling factor k based on the format of the random access preamble used in the random access process.

Optionally, the correspondence between the TA scaling factor k and the format of the random access preamble may alternatively be stored in the access network device and/or the terminal device in a form of a table. If the terminal device stores the table, after determining the format of the random access preamble used by the terminal device in the random access process, the terminal device may determine the corresponding TA scaling factor k based on the format of the random access preamble. If the terminal device does not store the table, in the random access process, the terminal device send the random access preamble to the access network device, and after determining the corresponding TA scale factor k based on the format of the random access preamble, the access network device may return the TA scaling factor k to the terminal device.

For example, in the foregoing embodiment, in the random access process, a cyclic prefix (CP) length of the format of the random access preamble sent by the terminal device to the access network device determines a possible TA adjustment range of the terminal device. Further, it is determined whether an additional TA scaling factor needs to be introduced when the TA is determined, and a specific value of the TA scaling factor is determined. Therefore, a scaling factor k may be determined based on a used format of random access.

The TA scaling factor k may be determined based on a maximum CP length of a format of a random access preamble configured for a cell or a beam, so that a value of the TA scaling factor is shared by the entire cell or the beam. Alternatively, the scaling factor k may be determined based on a CP length of a format of a random access preamble selected by each user (group), so that different users may use different TA scaling factors k, to minimize a precision loss caused by using a scaling factor.

Optionally, in another embodiment of determining the TA scaling factor k in S202, the terminal device may determine different TA scaling factors k based on different satellite types of an accesses access network device.

If the access network device is the satellite base station, the satellite type may be a low-orbit type, a middle-orbit type, a high-orbit type, and the like that are classified by the satellite base station based on a running height. Satellites running in different orbits have different operating parameters, and therefore different TA scaling factors need to be set. After accessing the satellite base station, the terminal device may determine the type of the satellite base station, then determine, based on the type of the satellite base station, the working parameter, for example, a running track height and a common round-trip delay of the satellite base station, and finally determine, based on the working parameter of the satellite base station, a TA scaling factor corresponding to the current satellite base station. Optionally, the satellite type, the operating parameter, and a correspondence between the operating parameter and the TA scaling factor may be stored in the access network device and/or the terminal device in a form of a table. Alternatively, the access network device and/or the terminal device may directly store a table used to indicate a correspondence between the satellite type and the TA scaling factor. If the terminal device stores the table, after accessing the satellite base station, the terminal device may directly determine the corresponding TA scaling factor from the table based on the type of the satellite base station.

Optionally, in the foregoing embodiments of this application, a method for determining the TA scaling factor k of the terminal device may be jointly agreed upon by the terminal device and the access network device in advance, to ensure that a TA obtained through calculation by the terminal device is sufficient to cover the TA adjustment range.

Optionally, in another embodiment of this application, when adjusting the TA by using the formula $TA_2=TA_1+k\cdot(T_4-31)\cdot 16\cdot 64/2^\mu$ in S203, the terminal device may further add an offset parameter offset to the TA adjustment, that is, may adjust the TA by using a formula $TA_2=TA_1+k\cdot(T_4-31)\cdot 16\cdot 64/2^\mu+\text{offset}$. In this way, the TA adjustment range of the terminal device is further expanded. The offset parameter may be a fixed value, or may be obtained by using a function related to a TA adjustment parameter k, or may be obtained by using a function related to the height at which the access network device is located.

Further, in the TA determining method for a terminal device provided in the foregoing embodiment, mobility of the terminal device and the access network device are considered. When the access network device is the satellite base station, because a running track of the satellite base station is relatively fixed, when the terminal device is in a static state, a change law of the TA of the terminal device caused by movement of the satellite base station is also fixed. Therefore, if the terminal device has learnt information such as a track height of the satellite base station and a location of the terminal device, an indication of the satellite base station may not be required, and the terminal device directly determines the TA adjustment that needs to be adjusted, and pre-compensates the TA.

Figure 8:
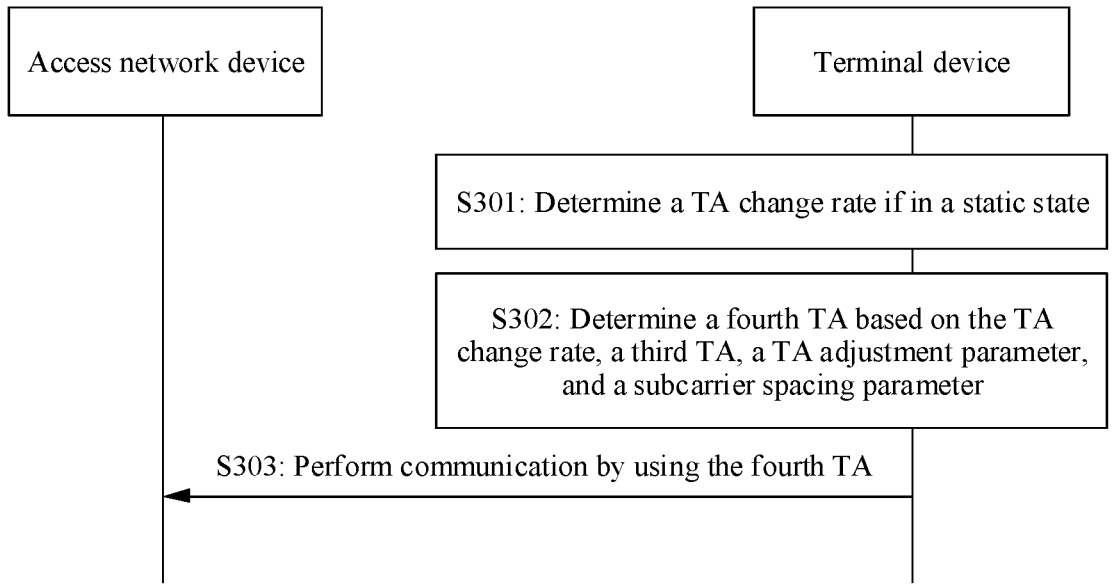
FIG. 8 is a schematic flowchart of an embodiment of a TA determining method for a terminal device according to this application.

For example, FIG. 8 is a schematic flowchart of an embodiment of a TA determining method for a terminal device according to this application. The TA determining method for a terminal device shown in FIG. 8 includes following steps.

S301: If the terminal device is in a static state, a TA drift rate of the terminal device is determined, where the TA drift rate is used to indicate a TA adjustment that is in a cell in which the terminal device is located and that is caused by movement of an access network device.

In an embodiment in S301, the terminal device may determine the TA drift rate of the terminal device according to a third mapping relationship, where the third mapping relationship includes a correspondence between a Doppler frequency shift of at least one access network device and the TA drift rate of the terminal device.

Figure 9:
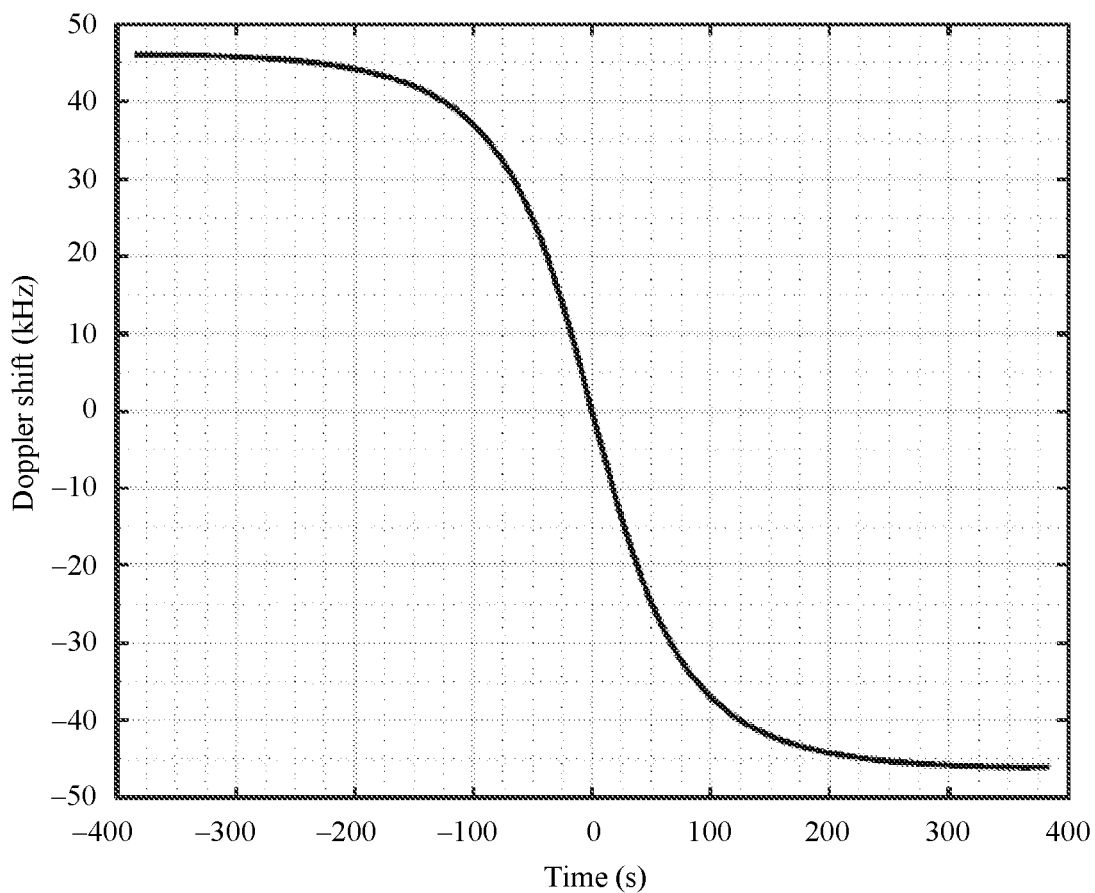
FIG. 9 is a schematic diagram of a Doppler frequency shift of an access network device according to this application.
Figure 10:
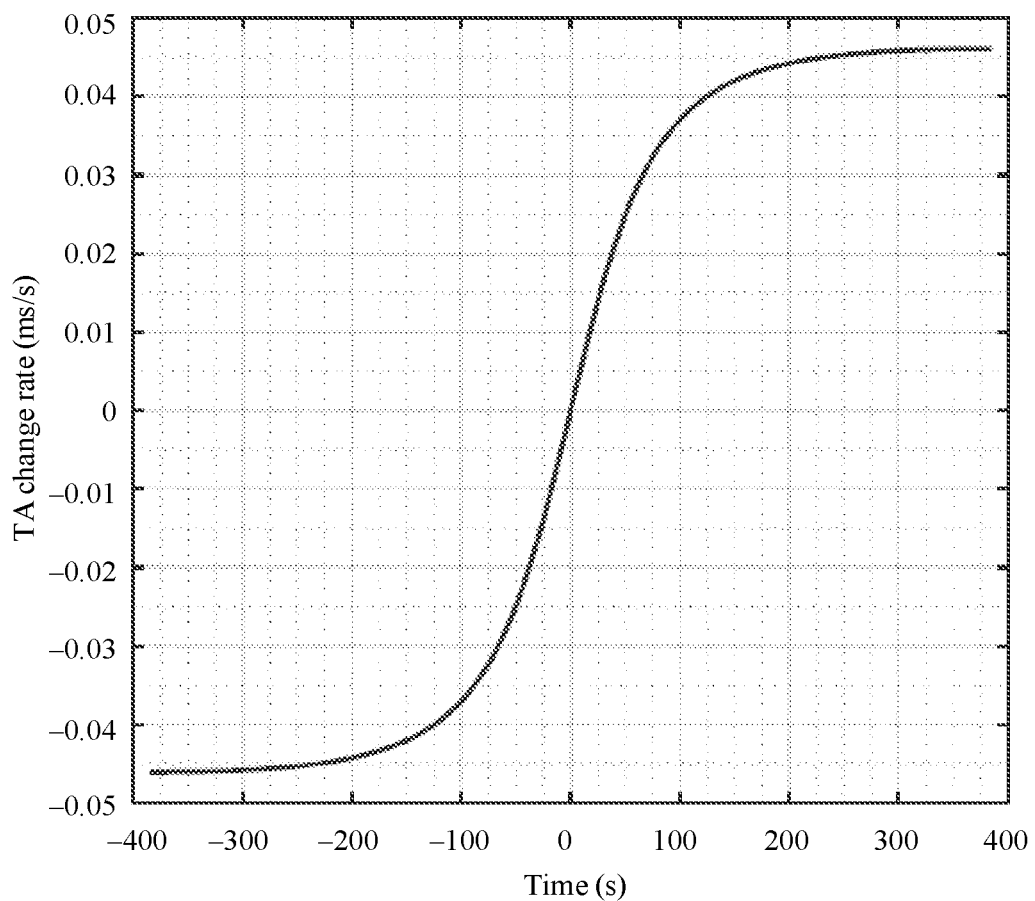
FIG. 10 is a schematic diagram of a TA drift rate of a terminal device according to this application.

For example, the terminal device may determine the TA drift rate of the terminal device based on a Doppler frequency shift of the access network device obtained by measurement, where a correspondence is $D_{TA}=\lambda \cdot Fd$, and $D_{TA}$ is the TA drift rate, $\mu$ is a wavelength of a wireless communication signal sent by the access network device, and Fd is the Doppler frequency shift. FIG. 9 is a schematic diagram of a Doppler frequency shift of an access network device according to this application, and FIG. 10 is a schematic diagram of a TA drift rate of a terminal device according to this application. Based on a correspondence between FIG. 9 and FIG. 10, it can be learned that the Doppler frequency shift of the access network device is in an inverse proportional relationship with the TA drift rate of the terminal device.

S302: The terminal device determines a fourth TA based on the TA drift rate, a third TA, a TA adjustment parameter, and a subcarrier spacing parameter, where the third TA is a TA used when the terminal device communicates with the access network device before determining the fourth TA.

For example, the terminal device may calculate the fourth TA by using a formula $TA_4 = TA_3 + \Delta N_{TA} + \Delta N_{TA}' \cdot \Delta t$, where $\Delta N_{TA} = (T_A - 31) \cdot 16 \cdot 64/2^\mu$, TA is the TA adjustment parameter sent by the access network device, $\Delta N_{TA}'$ is the TA adjustment determined in S301, $\Delta t = t1-t0$, t0 is a time at which the terminal device receives the TA adjustment parameter, and t1 is a time at which the terminal device is to send uplink communication data to the access network device.

S303: The terminal device communicates with the access network device by using a fourth TA.

Finally, the terminal device communicates with the access network device by using the fourth TA determined in the foregoing steps, where the communication means that the terminal device needs to send uplink transmission data to the access network device a fourth TA time period in advance. It may be understood that, in the embodiment shown in FIG. 8, before determining the fourth TA, the terminal device sends the uplink transmission data to the access network device a third TA time period in advance. After determining the fourth TA in S302, the terminal device sends the uplink transmission data to the access network device the fourth TA time period in advance.

Figure 11:
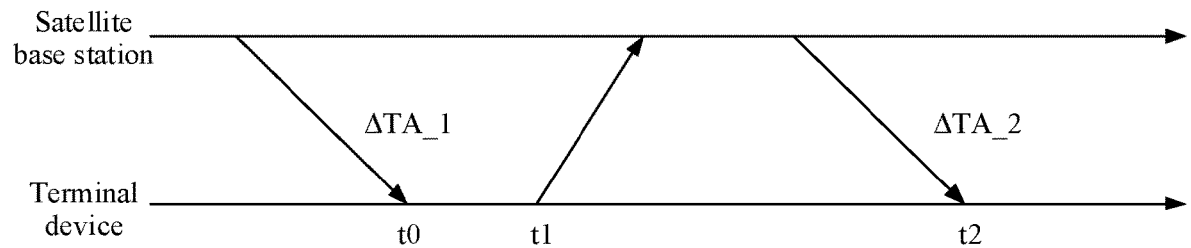
FIG. 11 is a schematic diagram of determining a fourth TA by a terminal device according to this application.

For example, FIG. 11 is a schematic diagram of determining a fourth TA by a terminal device according to this application. As shown in FIG. 11, after the terminal device uses, to determine a TA adjustment $\Delta TA\_1$, the TA adjustment parameter that is received at a moment t0 and that is indicated by the satellite base station, and before the satellite base station indicates a next TA adjustment parameter to determine a TA adjustment $\Delta TA\_2$, the terminal device predicts that a TA adjustment in a future period of time t0 to t1 is $\Delta TA'$, calculates the fourth TA by using a formula $TA_4 = TA_3 + \Delta TA_1 + \Delta TA' \cdot (t0-t1)$, and uses the fourth TA to send the uplink communication data to the satellite base station at a moment t1.

Optionally, after the terminal device pre-compensates the TA based on the Doppler frequency shift, a TA deviation still exists. Therefore, the satellite base station may estimate a corresponding TA deviation based on a received uplink signal of the terminal device, and send the corresponding TA deviation to the terminal device, to maintain accuracy of compensating the TA by the terminal device.

In conclusion, in the TA determining method for a terminal device provided in this embodiment, the terminal device may pre-compensate TA adjustment based on a parameter, for example, a Doppler, to avoid frequent indications of TA adjustment by the satellite base station, and reduce resource overheads. In addition, because a communication delay between the satellite base station and the terminal device is relatively large, performing pre-compensation by using this embodiment can reduce a TA error introduced by a delay when the satellite base station indicates to adjust the TA.

It should be noted that the embodiment shown in FIG. 8 may be independently implemented, or the embodiment shown in FIG. 8 may be based on the embodiment shown in FIG. 7. After the access network device sends the TA adjustment parameter to enable the terminal device to adjust the TA, and before the access network device sends the TA adjustment parameter next time, the terminal device may adjust the TA in a manner shown in FIG. 8 without an indication from the access network device.

Optionally, in the embodiment shown in FIG. 8, in another embodiment of determining the TA drift rate of the terminal device in S301, the terminal device may determine the TA drift rate of the terminal device based on a correspondence between a cell in which the terminal device is located and the TA drift rate. A TA drift rate caused by movement of the satellite base station is related to a geographical location of the terminal device. ΔTA drift rate of a terminal device closer to the satellite base station changes larger, and a TA drift rate of a terminal device farther from the satellite base station changes smaller or even tends to be straight. Therefore, in this embodiment, the satellite base station may divide cells based on change statuses of TA drift rates, and broadcast, in each cell, a TA drift rate corresponding to the cell, so that the terminal device determines the TA drift rate after receiving broadcast of the satellite base station.

Figure 12:
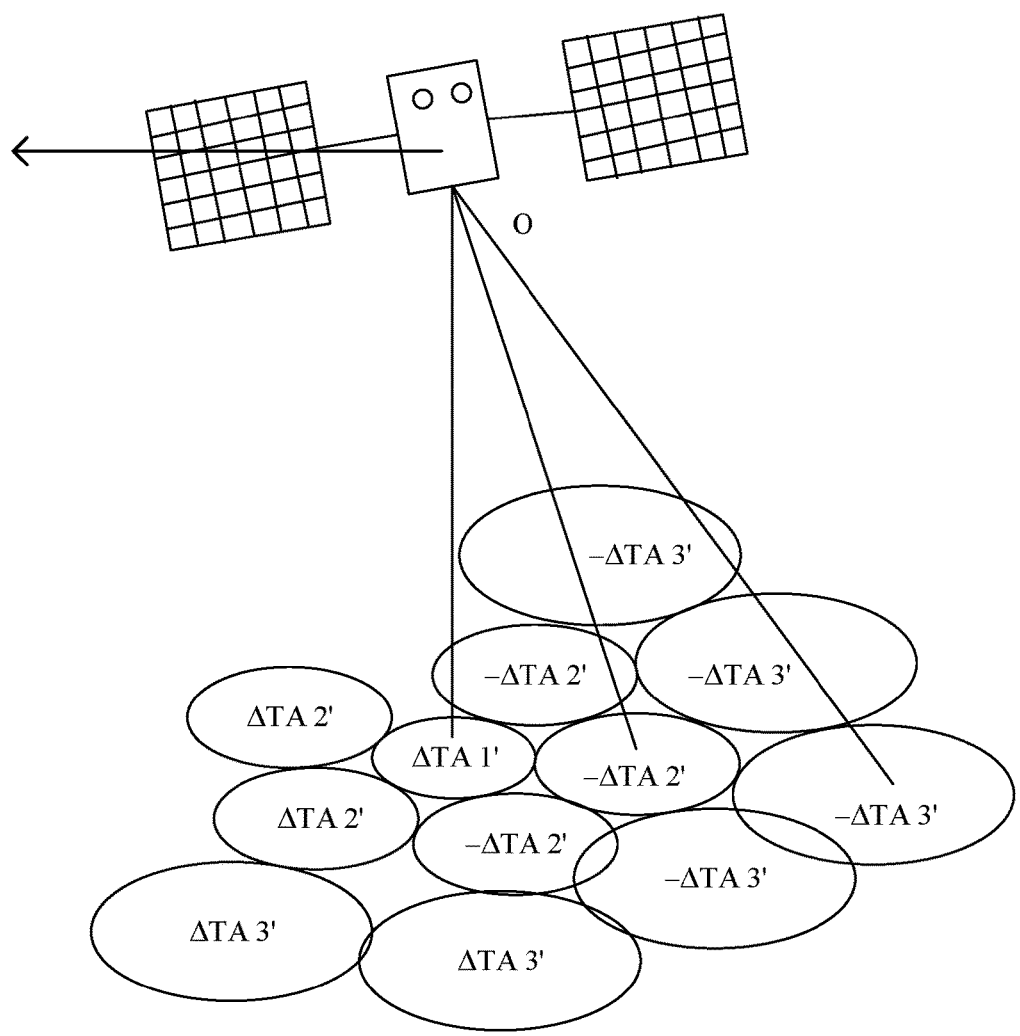
FIG. 12 is a schematic diagram 1 of cell division based on a TA drift rate according to this application.

For example, FIG. 12 is a schematic diagram 1 of cell division based on a TA drift rate according to this application. In the example shown in FIG. 12, to reduce a compensation error of a TA, different cells within coverage of a satellite base station O have different radiuses. A radius of a cell directly below the satellite base station O is minimum, and a TA drift rate of the cell is denoted as ΔTA 1'. A TA drift rate of a cell farther from the satellite base station O is denoted as ΔTA 2'. A radius of an outermost cell in the coverage of the satellite base station O is maximum, and a TA drift rate of the cell is denoted as ΔTA 3'.

In addition, in the example shown in FIG. 12, to reduce signaling overheads of indicating a TA drift rate by the access network device to the terminal device, in this embodiment, the TA drift rate may be further bound to a cell ID/indication parameter by the access network device in an implicit indication manner. In this way, the terminal device may determine, based on an ID of a cell in which the terminal device is located, a TA drift rate of the cell, and the access network device does not need to specifically send the TA drift rate to the terminal device.

TABLE 3

| Indication parameter/Cell | ID TA drift rate |
|---|---|
| 1 | |ΔTA 1'| |
| 2 | |ΔTA 2'| |
| 3 | |ΔTA 2'| |
| ... | ... |
| k | |ΔTA k'| |

For example, as shown in Table 3, the terminal device may store a mapping relationship between the TA drift rate and the cell ID in a table, where different cell IDs correspond to different TA drift rates. The terminal device may query the table based on an indication parameter broadcast by the satellite base station or a detected cell ID to obtain a specific TA drift rate. When the satellite base station in FIG. 12 runs to left in the figure, TA drift rates on the left are all positive and TA drift rates on the right are all negative, and TA drift rates stored in Table 3 are only absolute values. Therefore, same or different indication parameters may be used for TA drift rates of opposite symbols. When indication parameters are the same, the terminal device may determine whether the TA drift rate is positive or negative based on an estimation of a Doppler frequency shift of the satellite base station, to reduce storage space occupied by Table 3. For example, a TA is negative when the Doppler frequency shift is positive, and the TA is positive when the Doppler shift is negative.

Figure 13:
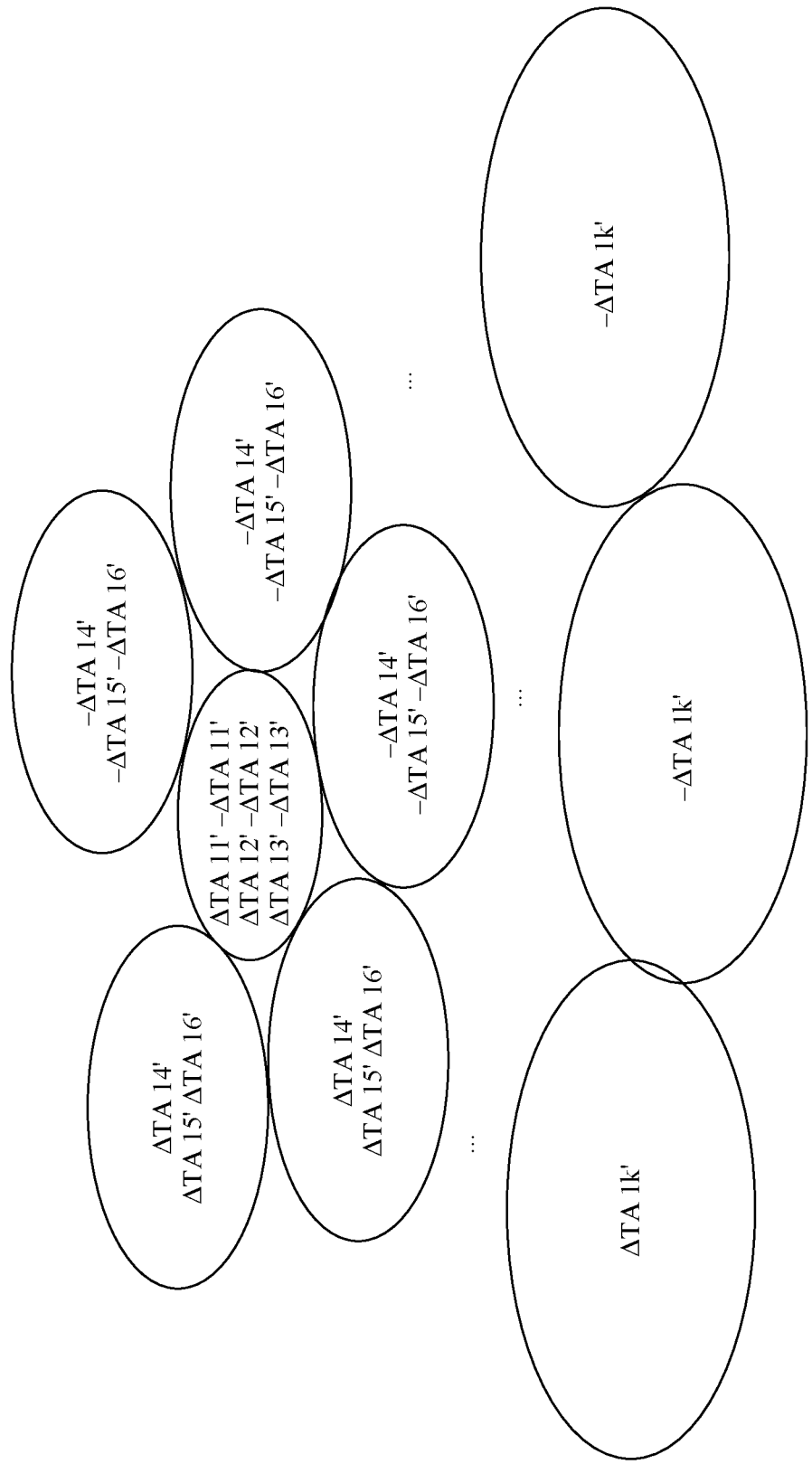
FIG. 13 is a schematic diagram 2 of cell division based on a TA drift rate according to this application.

Optionally, on the basis of the cell division based on the TA drift rate shown in FIG. 12, to achieve TA error precision required in an existing 5G NR, a cell radius directly below a radar base station needs to be set to 10 km during cell division. However, the cell radius is excessively small for a satellite, and different cell radius designs increase design and implementation complexity. Therefore, based on the embodiment shown in FIG. 12, this application further provides a division method for different TA drift rates in each cell. FIG. 13 is a schematic diagram 2 of cell division based on a TA drift rate according to this application. As shown in FIG. 13, in cells divided by a satellite base station, cells with different relative locations correspond to one or more TA drift rates. Different areas in a cell including a plurality of TA drift rates correspond to different TA drift rates. Therefore, the satellite base station may broadcast, in the cell, all TA drift rates in the cell, and terminal devices at different locations may select, based on a parameter such as a Doppler frequency shift, a corresponding TA drift rate in the cell in which the terminal devices are located. A cell directly below the satellite base station has a minimum radius, and TA drift rates that can be used by terminal devices in the cell include ΔTA 11', ΔTA 12', ΔTA 13', −ΔTA 11', −ΔTA 12' and −ΔTA 13'. A cell outside the cell directly below the satellite base station has a slightly larger radius. Based on different motion directions of the satellite base station, TA drift rates that can be separately used by terminal devices in the cell include ΔTA 14', ΔTA 15', and ΔTA 16', or include −ΔTA 14', −ΔTA 15' and −ΔTA 16'. A cell located at a boundary of maximum coverage of the satellite base station has a maximum radius. Based on different motion directions of the satellite base station, TA drift rates that can be separately used by terminal devices located in the cell include ΔTA 1k', or include −ΔTA 1k'. Therefore, in this embodiment, the terminal device can perform pre-compensation to reduce a TA error caused by a delay when the satellite base station indicates to adjust a TA. In addition, when a cell corresponding to the satellite base station is divided, a radius of the cell does not need to be limited based on a TA drift rate. This reduces design and implementation complexity.

In the embodiments provided in the foregoing embodiments of this application, the methods provided in this application are described and explained from perspectives of an access network device and a terminal device. To implement functions in the method provided in the embodiments of this application, the access network device and the terminal device may include a hardware structure and/or a software module, and implement the functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 14:
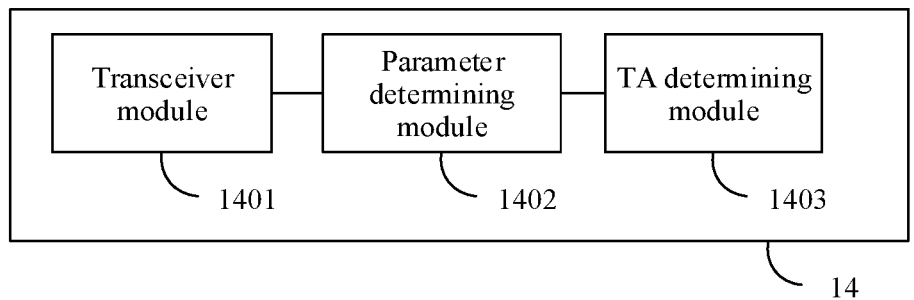
FIG. 14 is a schematic diagram of a structure in an embodiment of a terminal device according to this application.

FIG. 14 is a schematic diagram of a structure in an embodiment of a terminal device according to this application. The terminal device is configured to perform the method of the terminal device in the foregoing embodiment. As shown in FIG. 14, the terminal device provided in this embodiment includes a transceiver module 1401, a parameter determining module 1402, and a TA determining module 1403. The transceiver module 1401 is configured to obtain a TA adjustment parameter from an access network device, where the TA adjustment parameter is used to indicate a TA adjustment of a terminal device. The parameter determining module 1402 is configured to determine a TA scaling factor of the terminal device, a subcarrier spacing parameter of the terminal device, and a first TA used when the terminal device communicates with the access network device before receiving the TA adjustment parameter, where the TA scaling factor is used to perform scaling processing on the TA adjustment of the terminal device. The TA determining module 1403 is further configured to determine a second TA based on the TA adjustment parameter, the TA scaling factor, the subcarrier spacing parameter, and the first TA. The transceiver module 1401 is further configured to communicate with the access network device by using the second TA.

The terminal device provided in this embodiment may be configured to perform the method performed by the terminal device in the method shown in FIG. 7. Implementations and principles of the terminal device are the same, and details are not described again.

Optionally, the TA determining module 1403 is specifically configured to calculate $TA_2$ by using a formula $TA_2 = TA_1 + k \cdot (T_A - 31) \cdot 16 \cdot 64/2^\mu$, where $TA_1$ is the first TA, $T_A$ is the TA adjustment parameter, k is the TA scaling factor, $2^\mu$ is the subcarrier spacing parameter, $\Delta f = 2^\mu \cdot 15$ [kHz], and $\Delta f$ is a subcarrier spacing of the terminal device.

Optionally, the parameter determining module 1402 is specifically configured to determine the TA scaling factor based on a maximum moving speed of the terminal device, a moving speed of the access network device, and a frequency at which the access network device indicates the terminal device to adjust a TA.

Optionally, the parameter determining module 1402 is specifically configured to calculate the TA scaling factor k by using a formula $2(v_1+v_2)/f_{TA}/c = k \cdot 32 \cdot 16 \cdot 64 \cdot T_c/8$ where $v_1$ is the maximum moving speed of the terminal device, $v_2$ is the moving speed of the access network device, $f_{TA}$ is the frequency at which the access network device indicates the terminal device to adjust the TA, c is a lightspeed, and $T_c$ is a basic time unit.

Optionally, the parameter determining module 1402 is further configured to determine whether the TA adjustment of the terminal device processed by the TA scaling factor meets a preset condition, and if the TA adjustment meets the preset condition, determine a second TA based on the TA adjustment parameter, the TA scaling factor, the subcarrier spacing parameter, and the first TA.

Optionally, the parameter determining module 1402 is specifically configured to determine the TA scaling factor based on the moving speed of the access network device, a height of the access network device, and a height timing advance of the access network device.

Optionally, the parameter determining module 1402 is specifically configured to determine, by searching a first mapping relationship, the TA scaling factor corresponding to the moving speed of the access network device, the height at which the access network device is located, and the height timing advance of the access network device. The first mapping relationship includes a correspondence between at least one of the moving speed of the access network device, the height of the access network device, and the height timing advance of the access network device, and the TA scaling factor.

Optionally, the parameter determining module 1402 is specifically configured to determine, by searching a second mapping relationship, the TA scaling factor corresponding to the subcarrier spacing of the terminal device, the moving speed of the access network device, the height at which the access network device is located, and the height timing advance of the access network device. The second mapping relationship includes a correspondence between at least one of the subcarrier spacing of the terminal device, the moving speed of the access network device, the height of the access network device, and the height timing advance of the access network device, and the TA scaling factor.

Optionally, the parameter determining module 1402 is specifically configured to determine the TA scaling factor based on a format of a random access preamble used by the terminal device in a process of randomly accessing the access network device.

Optionally, the TA determining module 1403 is further configured to determine the second TA based on a TA offset parameter, the TA adjustment parameter, the TA scaling factor, the subcarrier spacing parameter, and the first TA, where the TA offset parameter is used to perform offset processing on the TA adjustment of the terminal device.

Optionally, the transceiver module 1401 is further configured to receive indication information sent by the access network device, where the indication information is used to indicate a common delay of a cell in which the terminal device is located. The parameter determining module 1402 is further configured to determine the common delay.

The terminal device provided in this embodiment may be configured to perform the method performed by the terminal device in the method shown in FIG. 3. Implementations and principles of the terminal device are the same, and details are not described again.

Optionally, the transceiver module 1401 is further configured to: when the terminal device accesses the access network device for a first time, obtain a TA initial parameter from the access network device. The TA determining module 1403 is further configured to determine an initial TA based on the common delay, the TA initial parameter, and the subcarrier spacing parameter.

Optionally, the common delay includes the height timing advance of the access network device and an angular timing advance of the cell in which the terminal device is located.

Optionally, the parameter determining module 1402 is further configured to: if the terminal device is in a static state, determine a TA drift rate of the terminal device, where the TA drift rate is used to indicate a TA adjustment that is in the cell in which the terminal device is located and that is caused by movement of the access network device.

The TA determining module 1403 is further configured to determine a fourth TA based on the TA drift rate, a third TA, the TA adjustment parameter, and the subcarrier spacing parameter, where the third TA is a TA used when the terminal device communicates with the access network device before determining the fourth TA. The transceiver module 1401 is further configured to communicate with the access network device by using the fourth TA.

Optionally, the TA determining module 1403 is further configured to calculate the fourth TA by using a formula $TA_4=TA_3+\Delta N_{T4}+\Delta N_{T4}'\cdot \Delta t$, where $\Delta N_{T4}=(T_A-31)\cdot 16\cdot 64/2^\mu$, $T_A$ is the TA adjustment parameter sent by the access network device, $\Delta N_{T4}'$ is the TA adjustment, $\Delta t=t1-t0$, t0 is a time at which the terminal device receives the TA adjustment parameter, and t1 is a time at which the terminal device is to send uplink communication data to the access network device.

Optionally, the parameter determining module 1402 is further configured to determine the TA drift rate of the terminal device according to a third mapping relationship, where the third mapping relationship includes a correspondence between a Doppler frequency shift of at least one access network device and the TA drift rate of the terminal device.

The terminal device provided in this embodiment may be configured to perform the method performed by the terminal device in the method in the foregoing embodiments. Implementations and principles of the terminal device are the same, and details are not described again.

Figure 15:
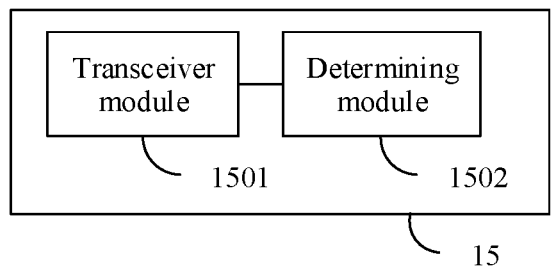
FIG. 15 is a schematic diagram of a structure in an embodiment of an access network device according to this application.

FIG. 15 is a schematic diagram of a structure in an embodiment of an access network device according to this application. The access network device is configured to perform the method of the access network device in the foregoing embodiment. As shown in FIG. 15, the access network device provided in this embodiment includes a transceiver module 1501, and a determining module 1502. The determining module 1502 is configured to determine a TA adjustment parameter of a terminal device, where the TA adjustment parameter is used to indicate a TA adjustment of the terminal device. The transceiver module 1501 is configured to send the TA adjustment parameter to the terminal device, to enable the terminal device to determine a second TA based on the TA adjustment parameter, a TA scaling factor, a subcarrier spacing parameter, and a first TA, where the TA scaling factor is used to perform scaling processing on the TA adjustment of the terminal device, and the first TA is a TA used when the terminal device communicates with the access network device before the terminal device receives the TA adjustment parameter.

The access network device provided in this embodiment may be configured to perform the method performed by the access network device in the method shown in FIG. 7. Implementations and principles of the terminal device are the same, and details are not described again.

Optionally, the transceiver module 1501 is further configured to send indication information to the terminal device, where the indication information is used to indicate a common delay of a cell in which the terminal device is located. Optionally, the common delay includes a height timing advance of the access network device and an angular timing advance of the cell in which the terminal device is located.

Optionally, the transceiver module 1501 is specifically configured to: broadcast the common delay in the cell in which the terminal device is located; or broadcast the height timing advance in a coverage area of the access network device and broadcast the angular timing advance in the cell in which the terminal device is located.

The access network device provided in this embodiment may be configured to perform the method performed by the access network device in the method in the foregoing embodiments. Implementations and principles of the terminal device are the same, and details are not described again.

Division into the modules in the embodiments of this application is an example, is merely division into logical functions, and may be other division in an actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 16:
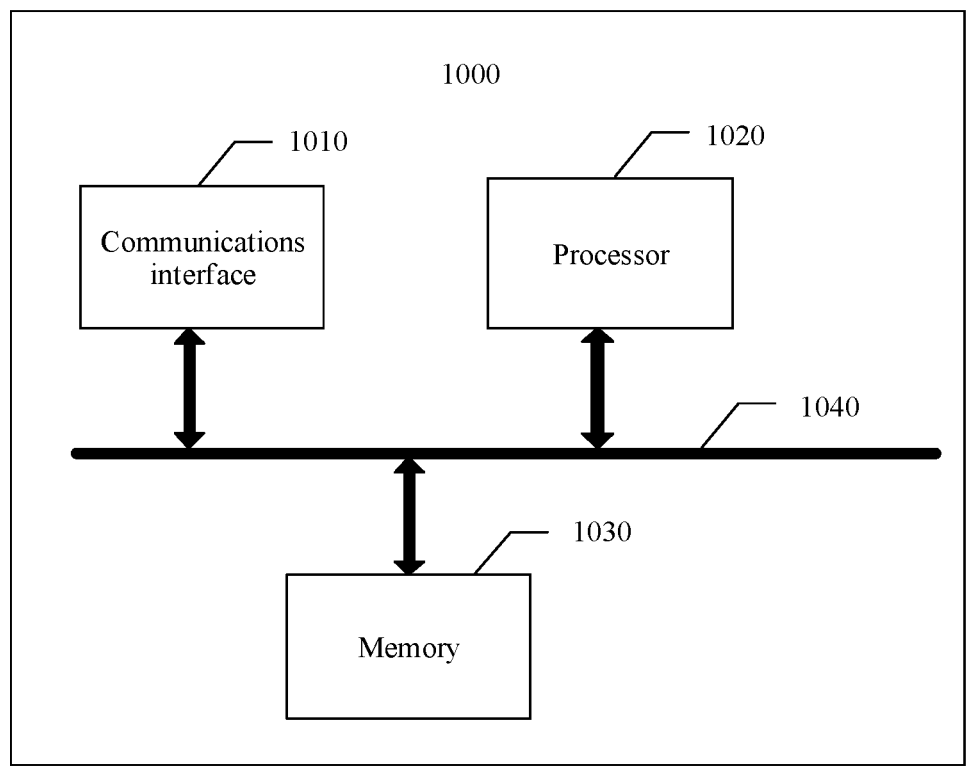
FIG. 16 is a schematic diagram of a structure in an embodiment of a communications apparatus according to this application.

FIG. 16 is a schematic diagram of a structure in an embodiment of a communications apparatus according to this application. The communications apparatus shown in FIG. 16 may be configured to serve as the terminal device in any one of the foregoing embodiments of this application or the access network device in any one of the foregoing embodiments, to implement the foregoing TA determining method for a terminal device. The communications apparatus 1000 includes a communications interface 1010, a processor 1020, and a memory 1030. The communications interface 1010 may be a transceiver, a circuit, a bus, or an interface in another form, and is configured to communicate with another device by using a transmission medium. The communications interface 1010, the processor 1020, and the memory 1030 are coupled. Couplings in the embodiments of this application are indirect couplings or communication connections between apparatuses, units, or modules, may be implemented in electronic, mechanical, or other forms, and are used for information exchange between the apparatuses, the units, or the modules.

In this embodiment of this application, a specific connection medium between the communications interface 1010, the processor 1020, and the memory 1030 is not limited. In this embodiment of this application, the communications interface 1010, the memory 1030, and the processor 1020 are connected through a bus 1040 in FIG. 16. The bus is represented by using a bold line in FIG. 16. A connection manner of other components is merely schematically described and is not limitative. The bus may be classified into an address bus, a data bus, a control bus, and the like. For ease of representation, only one bold line is used to represent the bus in FIG. 16, but this does not mean that there is only one bus or only one type of bus.

In an embodiment, if the communications apparatus shown in FIG. 16 is a terminal device, the terminal device may be configured to implement the methods performed by the terminal device in the foregoing embodiments of this application.

For example, the communications interface 1010 is configured to obtain a TA adjustment parameter from an access network device, and send the TA adjustment parameter to the processor, where the TA adjustment parameter is used to indicate a TA adjustment of a terminal device. The memory 1030 stores instructions, and the processor 1020 invokes and executes the instructions, to enable the processor 1020 to determine, after receiving the TA adjustment parameter, a TA scaling factor of the terminal device, a subcarrier spacing parameter of the terminal device, and a first TA used when the terminal device communicates with the access network device before receiving the TA adjustment parameter. The processor 1020 further determines a second TA based on the TA adjustment parameter, the TA scaling factor, the subcarrier spacing parameter, and the first TA. The communications interface 1010 further communicates with the access network device by using the second TA. Alternatively, for example, the communications interface 1010 is further configured to receive indication information sent by the access network device, and send the indication information to the processor. The indication information is used to indicate a common delay of a cell in which the terminal device is located. The processor 1020 is further configured to: when receiving the indication information, determine the common delay based on the indication information. The communications interface 1010 is further configured to: when the terminal device accesses the access network device for a first time, obtain a TA initial parameter from the access network device, and send the TA initial parameter to the processor. The processor 1020 is further configured to: when receiving the TA initial parameter, determine an initial TA based on the common delay, the TA initial parameter, and the subcarrier spacing parameter.

For specific implementation of the foregoing example, refer to the detailed description in the example corresponding to the foregoing method. Details are not described herein again.

In another embodiment, if the communications apparatus shown in FIG. 16 is an access network device, the access network device may be configured to implement the methods performed by the access network device in the foregoing embodiments of this application.

For example, when the processor 1020 invokes and executes the instructions stored in the memory 1030, the processor 1020 is enabled to determine the TA adjustment parameter of the terminal device, and sends the TA adjustment parameter to the communications interface 1010. After receiving the TA adjustment parameter, the communications interface 1010 sends the TA adjustment parameter to the terminal device. Alternatively, for example, the communications interface 1010 is further configured to send the indication information to the terminal device, where the indication information is used to indicate the common delay of the cell in which the terminal device is located.

For specific implementation of the foregoing example, refer to the detailed description in the example corresponding to the foregoing method. Details are not described herein again.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software module.

In this embodiment of this application, the memory may be a non-volatile memory, for example, a hard disk drive (HDD) or a solid-state drive (SSD), or may be a volatile memory, for example, a random-access memory (random access memory, RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

All or some of the foregoing methods in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A timing advance (TA) determining method for implemented in a terminal device, the method comprising:
    obtaining a TA adjustment parameter from an access network device, wherein the TA adjustment parameter is used to indicate a TA adjustment of the terminal device;
    determining a TA scaling factor of the terminal device, a subcarrier spacing parameter of the terminal device, and a first TA used when the terminal device communicates with the access network device before receiving the TA adjustment parameter, wherein the TA scaling factor is used to perform scaling processing on the TA adjustment of the terminal device; and
    determining a second TA based on the TA adjustment parameter, the TA scaling factor, the subcarrier spacing parameter, and the first TA.

2. The method according to claim 1, wherein the determining a second TA based on the TA adjustment parameter, the TA scaling factor, the subcarrier spacing parameter, and the first TA comprises:
    calculating $TA_2$ using a formula $TA_2 = TA_1 + k \cdot (T_A - 31) \cdot 16 \cdot 64 / 2^\mu$, wherein
    $TA_1$ is the first TA, $T_A$ is the TA adjustment parameter, k is the TA scaling factor, $2^\mu$ is the subcarrier spacing parameter, $\Delta f = 2^\mu \cdot 15$ [kHz], and $\Delta f$ is a subcarrier spacing of the terminal device.

3. The method according to claim 1, wherein the determining a TA scaling factor comprises:
    determining the TA scaling factor based on a maximum moving speed of the terminal device, a moving speed of the access network device, and a frequency at which the access network device indicates the terminal device to adjust the TA.

4. The method according to claim 3, wherein the determining the TA scaling factor based on a maximum moving speed of the terminal device, a moving speed of the access network device, and a frequency at which the access network device indicates the terminal device to adjust the TA comprises:
    calculating the TA scaling factor k using a formula $2(v_1 + v_2)/f_{TA}/c = k \cdot 32 \cdot 16 \cdot 64 \cdot T_c / 8$, wherein
    $v_1$ is the maximum moving speed of the terminal device, $v_2$ is the moving speed of the access network device, $f_{TA}$ is the frequency at which the access network device indicates the terminal device to adjust the TA, c is a lightspeed, and $T_c$ is a basic time unit.

5. The method according to claim 1, wherein the determining a TA scaling factor comprises:
    determining the TA scaling factor based on a moving speed of the access network device, a height of the access network device, and a height timing advance of the access network device.

6. The method according to claim 1, wherein the determining a TA scaling factor comprises:
    determining the TA scaling factor based on a format of a random access preamble used by the terminal device in a process of randomly accessing the access network device.

7. The method according to claim 1, wherein the determining a TA scaling factor comprises:
    determining the TA scaling factor based on attribute information of the access network device.

8. The method according to claim 1, wherein before the obtaining a TA adjustment parameter from an access network device, the method further comprises:
    receiving indication information sent by the access network device, wherein the indication information is used to indicate a common delay of a cell in which the terminal device is located; and
    determining the common delay based on the indication information.

9. The method according to claim 8, wherein before the obtaining a TA adjustment parameter from an access network device, the method further comprises:
    when the terminal device accesses the access network device for a first time, obtaining a TA initial parameter from the access network device; and
    determining an initial TA based on the common delay, the TA initial parameter, and the subcarrier spacing parameter.

10. The method according to claim 8, wherein
    the common delay comprises the height timing advance of the access network device and an angular timing advance of the cell in which the terminal device is located.

11. The method according to claim 1, further comprising:
    when the terminal device is in a static state, determining a TA drift rate of the terminal device, wherein the TA drift rate is used to indicate a TA adjustment that is in the cell in which the terminal device is located and that is caused by movement of the access network device; and determining a fourth TA based on the TA drift rate, a third TA, the TA adjustment parameter, and the subcarrier spacing parameter, wherein the third TA is a TA used when the terminal device communicates with the access network device before determining the fourth TA.

12. The method according to claim 11, wherein the determining a fourth TA based on the TA drift rate, a third TA, the TA adjustment parameter, and the subcarrier spacing parameter comprises:

calculating the fourth TA using a formula $TA_4=TA_3+\Delta N_{TA}+\Delta N_{TA}'\cdot \Delta t$, wherein $\Delta N_{TA}=(T_A-31)\cdot 16\cdot 64/2^\mu$, $T_A$ is the TA adjustment parameter sent by the access network device, $\Delta N'_{TA}$ is the TA adjustment, $\Delta t=t1-t0$, t0 is a time at which the terminal device receives the TA adjustment parameter, and t1 is a time at which the terminal device is to send uplink communication data to the access network device.

13. The method according to claim 11, wherein the determining a TA drift rate of the terminal device comprises:

determining the TA drift rate of the terminal device according to a third mapping relationship, wherein the third mapping relationship comprises a correspondence between a Doppler frequency shift of at least one access network device and the TA drift rate of the terminal device.

14. A timing advance (TA) determining method implemented in a network access device, the method comprising:

determining a TA adjustment parameter of a terminal device, wherein the TA adjustment parameter is used to indicate a TA adjustment of the terminal device; and sending the TA adjustment parameter to the terminal device, to enable the terminal device to determine a second TA based on the TA adjustment parameter, a TA scaling factor, a subcarrier spacing parameter, and a first TA, wherein the TA scaling factor is used to perform scaling processing on the TA adjustment of the terminal device, and the first TA is a TA used when the terminal device communicates with an access network device before receiving the TA adjustment parameter.

15. The method according to claim 14, further comprising:

sending indication information to the terminal device, wherein the indication information is used to indicate a common delay of a cell in which the terminal device is located.

16. The method according to claim 15, wherein the common delay comprises a height timing advance of the access network device and an angular timing advance of the cell in which the terminal device is located.

17. The method according to claim 16, wherein the sending indication information to the terminal device comprises:

broadcasting the common delay in the cell in which the terminal device is located;

or broadcasting the height timing advance in a coverage area of the access network device, and broadcasting the angular timing advance in the cell in which the terminal device is located.

18. A timing advance (TA) determining apparatus for a terminal device, configured to perform the method according to claim 1.

19. A communications apparatus, comprising a processor and a memory, wherein the memory stores instructions; and when the processor invokes and executes the instructions, the apparatus is enabled to perform the method according to claim 1.

20. A computer-readable storage medium, comprising instructions, wherein when the instructions are run on a computer, the computer is enabled to perform the method according to claim 1.

* * * * *

UNITED STATES PATENT AND TRADEMARK OFFICE
CERTIFICATE OF CORRECTION

| | | |
|---|---|---|
| PATENT NO. | : 11,985,697 B2 | Page 1 of 1 |
| APPLICATION NO. | : 17/513546 | |
| DATED | : May 14, 2024 | |
| INVENTOR(S) | : Chen et al. | |

It is certified that error appears in the above-identified patent and that said Letters Patent is hereby corrected as shown below:

In the Claims

Claim 1: Column 35, Line 42: "A timing advance (TA) determining method for imple-" should read as -- A timing advance (TA) determining method imple- --.

Signed and Sealed this
Second Day of December, 2025

John A. Squires
*Director of the United States Patent and Trademark Office*